(12) United States Patent
Okamura

(10) Patent No.: US 6,922,834 B1
(45) Date of Patent: Jul. 26, 2005

(54) DATA PROCESSING APPARATUS, DATA PROCESSING METHOD, AND PROGRAM PROVIDING MEDIUM

(75) Inventor: Hideaki Okamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/517,018

(22) Filed: Mar. 2, 2000

(30) Foreign Application Priority Data

Mar. 4, 1999 (JP) ............................................ 11-057689

(51) Int. Cl.[7] .............................................. G06F 9/00
(52) U.S. Cl. ...................................... 719/310; 717/104
(58) Field of Search ........................... 709/310; 719/310

(56) References Cited

U.S. PATENT DOCUMENTS

| | | | | |
|---|---|---|---|---|
| 5,386,568 A | * | 1/1995 | Wold et al. | 717/162 |
| 5,560,012 A | * | 9/1996 | Ryu et al. | 717/104 |
| 5,740,384 A | * | 4/1998 | Asthana et al. | 710/305 |
| 6,430,607 B1 | * | 8/2002 | Kavner | 709/217 |

OTHER PUBLICATIONS

Marc H. Brown et al, Distributed Active Object, Apr. 15, 1996.*

* cited by examiner

*Primary Examiner*—Meng-Al T. An
*Assistant Examiner*—LeChi Truong
(74) *Attorney, Agent, or Firm*—Frommer Lawrence & Haug LLP; William S. Frommer; Hans R. Mahr

(57) ABSTRACT

In a system employing an object-oriented operating system, the invention improves the performance in execution of the overall system while flexibility of the system is maintained. A plurality of objects communicating messages among them are each constituted by any of a composite object made up of one or more objects and a standard object that is an object other than a composite object. An identifier is attached to each of the standard object and the component objects so that each standard object and each component object can be referenced from any object. For the composite object, one composite object is executed by one execution thread, and the execution thread is shared by each component object of the composite object.

4 Claims, 17 Drawing Sheets

| MESSAGE SELECTOR | ENTRY (POINTER TO METHOD) |
|---|---|
| selector_1 | entry_1 |
| selector_2 | entry_2 |
| ⋮ | ⋮ |
| selector_n | entry_n |

DATA PROCESSING APPARATUS, DATA PROCESSING METHOD, AND PROGRAM PROVIDING MEDIUM

BACKGROUND OF THE INVENTION

1. Field of the Invention

The present invention relates to a data processing apparatus for executing an object-oriented operating system, a data processing method implemented with the object-oriented operating system, and a program providing medium which provides a data-processing program for the object-oriented operating system.

2. Description of the Related Art

There is known a technique of applying the object-oriented technology to an operating system and modularizing constituent elements of the operating system into objects. Such an operating system made up of constituent elements modularized into objects is called an object-oriented operating system. An object-oriented operating system, in which an application object executed on an operating system and an object serving as a constituent element of the operating system have a similar execution mechanism, is sometimes called a pure object-oriented operating system.

In an object-oriented operating system, service provided by the operating system is defined by a set of objects. A more flexible operating system than conventional can be constructed by dividing the service in units of object.

More specifically, an object-oriented operating system enables a system in match with user demanded functions to be easily constructed, for example, by appropriately combining objects, which provide the service of the operating system, before the start of execution of the operating system. Also, functions can be added or deleted so as to effect, e.g., optimization or update of a system in a dynamic manner without stopping the system. Thus, an object-oriented operating system is very superior in flexibility of system configuration and easiness of dynamic system changes.

Meanwhile, objects providing the service of an object-oriented operating system are called system objects. The system objects are operated in parallel. Then, the system objects communicate with each other by using a message communication mechanism, exchange messages, and establish synchronous relation among them. Those operations of the system objects increase independence of objects serving as parts of the system, and improve the flexibility of system configuration and the easiness of dynamic system changes. In other words, the flexibility of system configuration and the easiness of dynamic system changes can be improved by realizing a service providing section of the object-oriented operating system in the form of system objects capable of being added and deleted.

As described above, an object-oriented operating system has superior features. The object-oriented operating system however accompanies a problem that if messages are so frequently communicated between objects, the performance in execution of the overall system deteriorates due to an increased communication cost.

System designers of object-oriented operating systems are therefore required to design system objects by not only making use of the superior features of the object-oriented operating system, such as the flexibility of system configuration and the easiness of dynamic system changes, but also giving due consideration to balance between those superior features and the performance in practical execution.

SUMMARY OF THE INVENTION

The present invention has been made in view of the state of art set forth above, and is intended to maintain the superior features of an object-oriented operating system while improving the performance in execution of the overall system. Concretely, an object of the present invention is to provide a data processing apparatus and a data processing method which have functions to realize the above intention, and a program providing medium which provides a data processing program for achieving those functions.

The data processing apparatus according to the present invention is a data processing apparatus for executing an object-oriented operating system made up of a plurality of objects which are operated in parallel and communicate messages among them. The data processing apparatus includes a unit for rendering an object, which has received a combining request message requesting addition of a predetermined object, to create a table data structure used for referencing to the predetermined object as a component object, and to initialize the table data structure with data of the component object, thereby constituting a composite object. The data processing apparatus includes a unit for creating a data structure of at least one component object, registering the data structure in the table data structure, and registering a relationship between at least one message processing function possessed by the component object and a message interface for requesting the message processing function in the data structure of the component object.

In the above data processing apparatus, preferably, for initializing the table data structure, the composite object reads a data structure having predetermined settings in which a name of the component object, a number of message interfaces possessed by the component object, and a processing function for initializing the component object are described.

In the above data processing apparatus, preferably, the composite object has a specific execution thread and executes message processing issued to the component object with the specific execution thread.

In the above data processing apparatus, preferably, upon receiving a request for adding a predetermined component object, the composite object additionally registers a data structure of the predetermined-component object in the table data structure.

The above data processing apparatus preferably further comprises a unit for checking, when a predetermined object is added to the composite object, whether a sequential execution relation exists between the predetermined object and all of component objects making up the composite object, and a unit for adding the predetermined object after the sequential execution relation has been confirmed.

In the above data processing apparatus, preferably, the sequential execution relation is checked by a unit for checking the fact that at the time when a message is transmitted to the predetermined object, all of the component objects making up the composite object are not required to run in parallel to the predetermined object, a unit for checking the fact that at the time when the predetermined object transmits a message to one of the component objects making up the composite object, the one component object is never already under processing of another message, and a unit for checking the fact that at the time when the predetermined object receives a message from one of the component objects making up the composite object, the predetermined object is never already under processing of another message.

The above data processing apparatus preferably checks the fact that a sequential execution relation exists between one component object and all of the other component objects.

In the above data processing apparatus, preferably, upon receiving a request for separating a predetermined component object, the composite object deletes registration of a data structure of the predetermined component object from the table data structure.

In the above data processing apparatus, preferably, the composite object includes a unit for checking whether a sending source of a message transmitted to the composite object is a non-component object or one component object, and a unit for checking whether a destination of the message transmitted to the composite object is a non-component object or another component object.

In the above data processing apparatus, preferably, when the sending source of the message is one component object and the destination of the message is another component object, the composite object executes processing requested by the message without switching over an execution thread.

Also, the data processing method according to the present invention is a data processing method for an object-oriented operating system made up of a plurality of objects among which messages are communicated. The data processing method comprises a step of rendering an object, which has received a combining request message requesting addition of a predetermined object, to create a table data structure used for referencing to the predetermined object as a component object, and to initialize the table data structure with data of the component object, thereby constituting a composite object; and a step of creating a data structure of at least one component object, registering the data structure in the table data structure, and registering a relationship between at least one message processing function possessed by the component object and a message interface for requesting the message processing function in the data structure of the component object.

In the above data processing method, preferably, for initializing the table data structure, the composite object reads a data structure having predetermined settings in which a name of the component object, a number of message interfaces possessed by the component object, and a processing function for initializing the component object are described.

In the above data processing method, preferably, the composite object has a specific execution thread and executes message processing issued to the component object with the specific execution thread.

In the above data processing method, preferably, upon receiving a request for adding a predetermined component object, the composite object additionally registers a data structure of the predetermined component object in the table data structure.

The above data processing method preferably further executes a step of checking, when a predetermined object is added to the composite object, whether a sequential execution relation exists between the predetermined object and all of component objects making up the composite object, and a step of adding the predetermined object after the sequential execution relation has been confirmed.

In the data processing method, preferably, the sequential execution relation is checked by a step of checking the fact that at the time when a message is transmitted to the predetermined object, all of the component objects making up the composite object are not required to run in parallel to the predetermined object, a step of checking the fact that at the time when the predetermined object transmits a message to one of the component objects making up the composite object, the one component object is never already under processing of another message, and a step of checking the fact that at the time when the predetermined object receives a message from one of the component objects making up the composite object, the predetermined object is never already under processing of another message.

The data processing method preferably further comprises a step of checking the fact that a sequential execution relation exists between one component object and all of the other component objects.

In the above data processing method, preferably, upon receiving a request for separating a predetermined component object, the composite object deletes registration of a data structure of the predetermined component object from the table data structure.

In the above data processing method, preferably, the composite object includes a step of checking whether a sending source of a message transmitted to the composite object is a non-component object or one component object, and a step of checking whether a destination of the message transmitted to the composite object is a non-component object or another component object.

In the data processing method, preferably, when the sending source of the message is one component object and the destination of the message is another component object, the composite object executes processing requested by the message without switching over an execution thread.

Further, the program providing medium according to the present invention provides a data processing program for an object-oriented operating system made up of a plurality of objects among which messages are communicated. The data processing program comprises a step of rendering an object, which has received a combining request message requesting addition of a predetermined object, to create a table data structure used for referencing to the predetermined object as a component object, and to initialize the table data structure with data of the component object, thereby constituting a composite object; and a step of creating a data structure of at least one component object, registering the data structure in the table data structure, and registering a relationship between at least one message processing function possessed by the component object and a message interface for requesting the message processing function in the data structure of the component object.

Moreover, the data processing apparatus according to the present invention is a data processing apparatus for executing an object-oriented operating system. The data processing apparatus includes an object constituting unit for constituting objects, among which messages are communicated, by any of a composite object made up of one or more objects and a standard object that is an object other than a composite object. The data processing apparatus also includes an identifier setting unit for attaching an identifier to each of the standard object and the component objects constituted by the object constituting unit so that each standard object and each component object are referenced from any object. The data processing apparatus further includes an execution thread control unit for executing one composite object by one execution thread for the composite object included in the objects constituted by the object constituting unit, the execution thread being shared by each component object of the composite object.

The above data processing apparatus may further comprises an added-object information reading unit, an added-object specifying unit, and an object adding unit. When a message for requesting a predetermined object to be added as a component object to another object is inputted, the added-object information reading unit reads at least a name of the object to be added, the name being used to specify the predetermined object, and initializing method information for specifying a method in which an initializing procedure required for adding the predetermined object as a component object to the another object is described. The added-object specifying unit specifies the object to be added as a component object to the another object based on the name of the object to be added, the name being read by the added-object information reading unit. The object adding unit adds the object specified by the added-object specifying unit, as a component object, to the another object by executing the method specified based on the initializing method information read by the added-object information reading unit.

The above data processing apparatus may further comprise an identifier creating unit and a method information storing unit. When a predetermined object is added as a component object to another object, the identifier creating unit creates a descriptor, in which information of the object to be added as a component object is stored, in correspondent relation to the identifier. The method information storing unit stores, in the descriptor created by the identifier creating unit, at least information for calling a method provided in the object to be added as a component object.

The above data processing apparatus may further comprise t a deleted-object information reading unit, a deleted-object specifying unit, an object deleting unit, and a descriptor deleting unit. When a message for requesting a predetermined component object to be deleted from a composite object is inputted, the deleted-object information reading unit reads at least a name of the object to be deleted, the name being used to specify the component object to be deleted. The deleted-object specifying unit specifies the component object to be deleted from a composite object based on the name of the object to be deleted, the name being read by the deleted-object information reading unit. The object deleting unit deletes the component object specified by the deleted-object specifying unit from the composite object. The descriptor deleting unit specifies, based on the identifier corresponding to the component object specified by the deleted-object specifying unit, the descriptor corresponding to the specified component object and then deletes the specified descriptor.

In the above data processing apparatus, preferably, when constituting a composite component from a plurality of component objects, the object constituting unit constitutes the composite component upon satisfying of both a condition that at the time when a message is transmitted from one component object to another one of the component objects making up the composite object including the one component object, the two component objects are not required to run in parallel, and a condition that at the time when a message is transmitted from one component object to another one of the component objects making up the composite object including the one component object, the component object on the message receiving side is never under processing of another message.

In the above data processing apparatus, preferably, in the case of sending a message from one object to another object, when an object on the message transmitting side and an object on the message receiving side are both component objects and the both component objects are included in the same composite object, the execution thread control unit renders the object on the message receiving side to execute processing requested by the message transmitted from the object on the message transmitting side by using the same execution thread as that used by the object on the message transmitting side without switching over the execution thread.

The above data processing apparatus may further comprise, as an application program interface used for message communication between objects, an application program interface capable of being used in common regardless of whether the objects communicating messages therebetween are each a standard object or a component object.

Furthermore, the data processing method according to the present invention is a data processing method executed by an object-oriented operating system. In the data processing method, objects communicated messages among them are constituted by any of a composite object made up of one or more objects and a standard object that is an object other than a composite object. An identifier is attached to each of the standard object and the component objects so that each standard object and each component object are referenced from any object. For the composite object, one composite object is executed by one execution thread, the execution thread being shared by each component object of the composite object.

In the above data processing method, preferably, when a message for requesting a predetermined object to be added as a component object to another object is inputted, at least the following is read, i.e., a name of the object to be added, the name being used to specify the predetermined object, and initializing method information for specifying a method in which an initializing procedure required for adding the predetermined object as a component object to the another object is described. Then, the object to be added as a component object to the another object is specified based on the name of the object to be added. The object specified based on the name of the object to be added is added, as a component object, to the another object by executing the method specified based on the initializing method information.

In the above data processing method, preferably, when a predetermined object is added as a component object to another object, a descriptor, in which information of the object to be added as a component object is stored, is created in correspondent relation to the identifier, and at least information for calling a method provided in the object to be added as a component object is stored in the descriptor.

In the above data processing method, preferably, when a message for requesting a predetermined component object to be deleted from a composite object is inputted, at least a name of the object to be deleted is read, the name being used to specify the component object to be deleted. The component object to be deleted from a composite object is specified based on the name of the object to be deleted. Then, the component object specified based on the name of the object to be deleted is deleted from the composite object. Further, based on the identifier corresponding to the component object specified based on the name of the object to be deleted, the descriptor corresponding to the specified component object is specified and the specified descriptor is then deleted.

In the above data processing method, preferably, when constituting a composite component from a plurality of component objects, the composite component is constituted upon satisfying of both a condition that at the time when a message is transmitted from one component object to another one of the component objects making up the composite object including the one component object, the two component objects are not required to run in parallel, and a condition that at the time when a message is transmitted from one component object to another one of the component objects making up the composite object including the one component object, the component object on the message receiving side is never under processing of another message.

In the above data processing method, preferably, in the case of sending a message from one object to another object, when an object on the message transmitting side and an object on the message receiving side are both component objects and the both component objects are included in the same composite object, processing requested by the message transmitted from the object on the message transmitting side is executed by the object on the message receiving side by using the same execution thread as that used by the object on the message transmitting side without switching over the execution thread.

In the above data processing method, preferably, when communicating a message between objects, the communication is performed by using an application program interface capable of being used in common regardless of whether the objects communicating messages therebetween are each a standard object or a component object.

Still further, the program providing medium according to the present invention is a program providing medium for providing a data processing program for an object-oriented operating system. In the data processing program, objects communicating messages among them are constituted by any of a composite object made up of one or more objects and a standard object that is an object other than a composite object. An identifier is attached to each of the standard object and the component objects so that each standard object and each component object are referenced from any object. For the composite object, one composite object is executed by one execution thread, the execution thread being shared by each component object of the composite object.

DESCRIPTION OF THE PREFERRED EMBODIMENTS

An embodiment of the present invention will be described below in detail with reference to the drawings.

1. Hardware Environment

First, one example of the configuration of hardware, to which the present invention is applied, will be described with reference to FIG. 1. It is to be noted that an example in which the present invention is applied to a television receiver is described here as one embodiment of the present invention, but the present invention is of course also applicable to other types of data processing apparatuses. Stated differently, the present invention can be applied to a wide variety of data processing apparatuses in which operating systems are installed. In addition to a television receiver, the present invention is applicable to, e.g., audiovisual (AV) equipment, various office equipment, general computer equipment, and so on.

Figure 1:
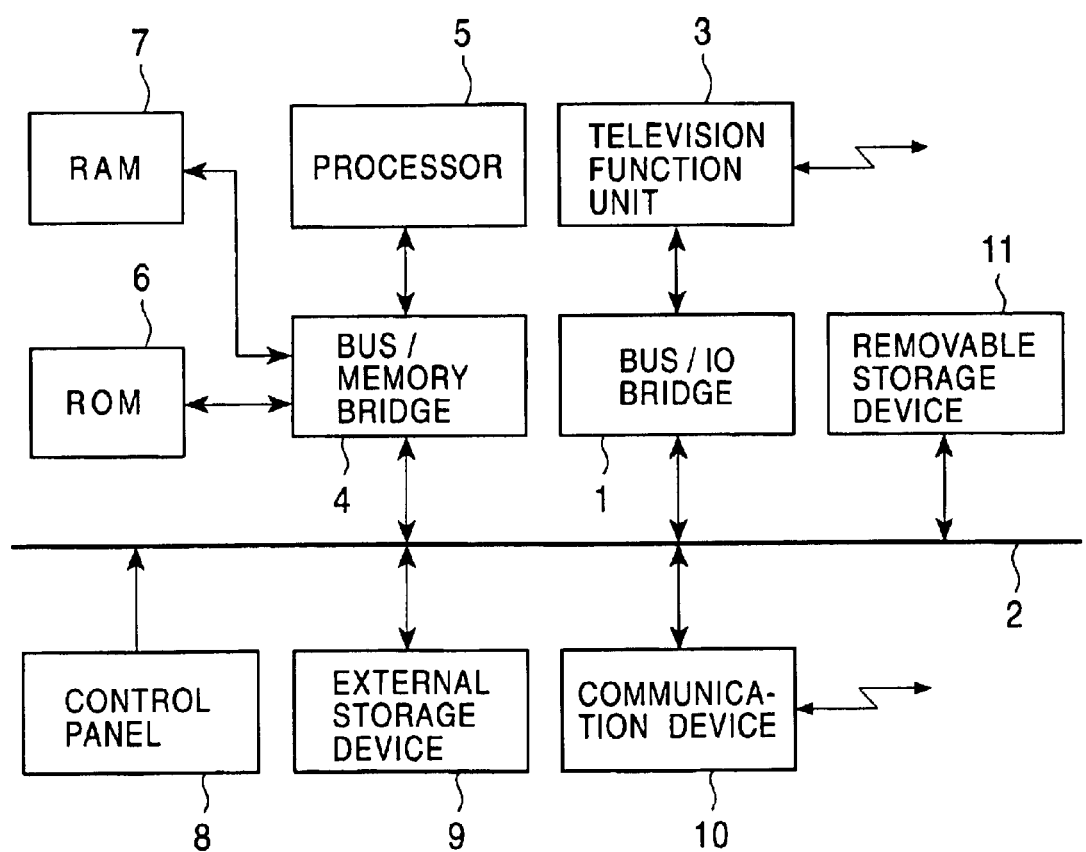
FIG. 1 is a block diagram showing one example of the configuration of a television receiver to which the present invention is applied.

The television receiver shown in FIG. 1, i.e., one data processing apparatus to which the present invention is applied, receives signals from a broadcast station via an antenna, a cable or the like. Based on the received signal, the television receiver displays an image on an image display device such as a cathode-ray tube or liquid crystal, and outputs sound from a loudspeaker.

In addition to functioning as an ordinary television, the television receiver can also receive programs and data from the outside. As shown in FIG. 1, the television receiver comprises a television function unit 3 connected to a bus 2 via a bus/IO bridge 1, a processor 5 connected to the bus 2 via a bus/memory bridge 4, a ROM (Read Only Memory) 6 and a RAM (Random Access Memory) 7 both connected to the processor 5 via the bus/memory bridge 4, a control panel 8 connected to the bus 2, and an external storage device 9, and a communication device 10.

The television function unit 3 has the function of reproducing an image and sound based on the signals received via an antenna, a cable or the like. The television function unit 3 is connected to the bus 2 via the bus/IO bridge 1 for transfer of signals to and from the other components.

The processor 5 controls the above-mentioned components of the television receiver, and is connected to the bus 2 via the bus/memory bridge 4. Also, the ROM 6 and the RAM 7 are connected to the processor 5 via the bus/memory bridge 4. The ROM 6 stores an operating system and an application program that are used to perform control by the processor 5. The RAM 7 serves as a work area for the processor 5. Specifically, the processor 5 executes the operating system and the application program, which are stored in the ROM 6, by using the RAM 7 as a work area, thereby controlling the components of the television receiver.

The control panel 8 is an input device for receiving an input entered upon user manipulation. For example, a signal indicating a change in channel, volume, etc. of the television receiver is inputted from the control panel B. Concretely, the control panel 8 comprises an input device having a plurality of buttons for entering various signals, a pointing device popularly called a mouse, or the like. A signal inputted from the control panel 8 is applied to the processor 5 via the bus 2 and the bus/memory bridge 4. Based on the signal inputted from the control panel 8, the processor 5 executes predetermined processing and controls the various components.

The external storage device 9 comprises a hard disc drive, for example, and is used to store image data, control data, a program downloaded via the communication device 10 from the outside, etc. The communication device 10 serves as an input/output unit for communicating data to and from the outside, and comprises a modem or terminal adapter, for example.

In addition to the ordinary television function provided by the television function unit 3, the television receiver can also receive programs and data from the outside via the communication device 10. In the case of upgrading the operating system, for example, the television receiver can receive a new software module from an external network via the communication device 10, and upgrade the operating system to the latest version.

Further, in the television receiver, the processor 5 controls the various components by executing the operating system stored in the ROM 6 and then executing the application program, which is stored in the ROM 6 or the external storage device 9, on the operating system. Namely, the television receiver includes the ROM 6 as a program providing medium which provides a data processing program for the operating system. Note that the operating system may be stored in the RAM 7 or the external storage device 9. In particular, where it is desired to constitute the operating system in rewritable fashion, the operating system is preferably stored in the RAM 7 or the external storage device 9. Further, the operating system may be stored in a removable storage device 11 that employs DVD-RW as a recording medium. In this case, operating system boot-up software is stored in the ROM 6, and the RAM 7 or the external storage device 9 is utilized as a work area for the operating system.

The operating system of this embodiment is a pure object-oriented operating system. Then, an application program for displaying moving images in the television function unit 3 and an application program for realizing a graphical user interface (GUI) to control the control panel 8, for example, are executed on the operating system.

2. Software Environment

The operating system, which embodies the present invention and is used in the television receiver shown in FIG. 1, will be next described in detail.

2-1 Configuration of Operating System

The operating system of this embodiment is made up of MetaCore as a basic section of the operating system and a group of objects as the other section. Here, the term "MetaCore" means a section that cannot be defined as objects. Namely, the MetaCore is a processing section for performing switchover in execution control between the objects, i.e., a thread switching section for performing switchover between execution threads.

Also, the MetaCore is a section difficult to change by a user program, while the group of objects is a section easy to change by a user program. Here, the term "change" means such a change of the operating system as requiring all application programs to be stopped and the operating system to be booted up again in order to reflect the change on the operating system.

The operating system of this embodiment is a pure object-oriented operating system in which an object constituting an application program executed on the operating system and an object constituting the operating system have a similar execution mechanism. Considering from the point of requesting and providing service, therefore, switchover in execution thread between objects can be summed up into the following two modes;

(1) one mode in which execution control is shifted from a service requestor to a service provider, and (2) the other mode in which execution control is shifted from a service provider to a service requester.

Here, an object on the side of a service requestor requesting the service provided by the operating system is referred to as a "base level object". Also, an object on the side of a service provider providing the service provided by the operating system is referred to as "MetaObject". Further, service provided by the MetaObject is referred to as "Meta-Operation". The relationship between a service requester and a service provider is referred to as a "base/meta relationship". From this point of view, all operations in the operating system can be expressed using the base/meta relationship between objects.

In the following description, one example of the MetaObject is referred to as a system object, and one example of the base object is referred to as an application object. It can be also said that when one object provides the service of the operating system to the other between two system objects, the object on the side requesting the service of the operating system is a base object and the object on the side providing the service of the operating system is a Metaobject. Details of the base/meta relationship are described in Japanese Unexamined Patent Publication No. 9-911143 filed by the assignee of this application.

Then, in the operating system of this embodiment, a thread switching section for performing switchover between the above two modes of execution threads is provided as the MetaCore. Namely, in the operating system of this embodiment, the least necessary mechanism for constructing the operating system is provided by the MetaCore.

In other words, the operating system of this embodiment includes the MetaCore as a thread switching section for performing switchover of the execution thread from one to another along with rewriting of information regarding the execution thread. The contents of the objects constituting the operating system can be changed without changing the contents of the MetaCore.

The operating system of this embodiment enables a highly flexible system to be realize which is minimized in a section difficult to change by users and is easily adaptable for various hardware environments and user demands. For example, a section for performing inter-object communication to transfer messages between objects can be replaced or updated without booting up the operating system again. Accordingly, it is very easily feasible to correct bugs in the section performing the inter-object communication, and to add a new function corresponding to addition of a new device. Further, by concentrating sections depending on a processor architecture in the MetaCore, portability of other system constituent elements can be increased.

Figure 2:
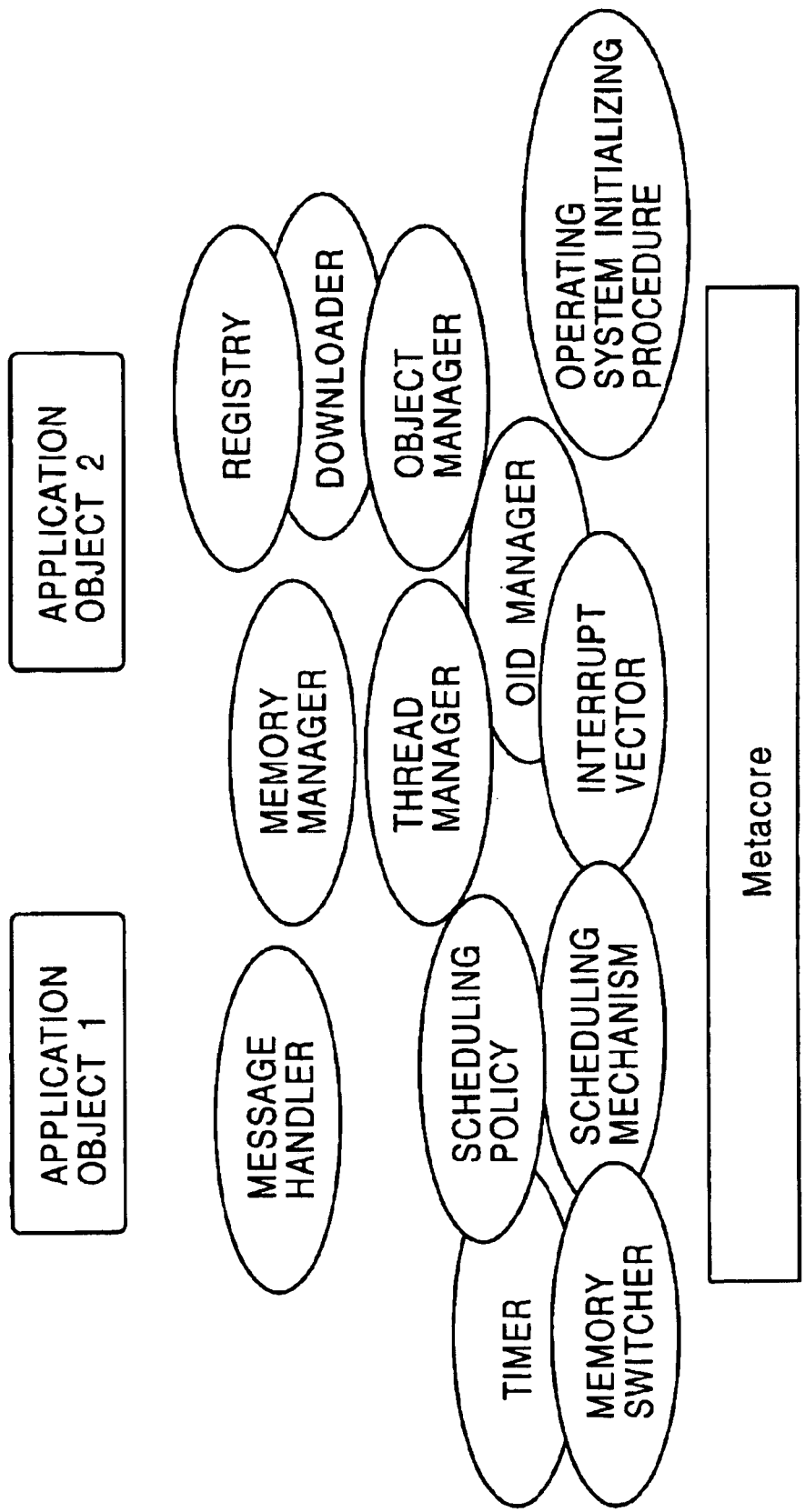
FIG. 2 is a representation showing one example of a group of objects constituting an operating system.

FIG. 2 shows one example of a group of objects constituting the operating system of this embodiment. In the example shown in FIG. 2, the operating system includes, as system objects, "operating system initializing procedure", "object manager", "downloader", "registry", "interrupt vector", "OID (Object ID) manager", "thread manager", "memory manager", "scheduling mechanism", "scheduling policy", "message handler", "memory switcher", and "timer". These objects are operated to run on the MetaCore.

Note that FIG. 2 shows a group of objects that resides in one example of the operating system having a typical configuration, and the objects in the group may be changed. Namely, in the operating system of this embodiment, a system configuration can be flexibly changed by users, and the objects of the group constituting the operating system can be easily changed. Of the object group shown in FIG. 2, however, the object "operating system initializing procedure" is essential, that is, only this object "operating system initializing procedure" must be always included in the object group constituting the operating system.

Of the object group shown in FIG. 2, the object "operating system initializing procedure" executes an initializing procedure that is first executed at boot-up of the operating system. The object "object manager" manages creation and deletion of objects. The object "downloader" executes a procedure for downloading or unloading objects from a network, a secondary storage device, a removable medium or the like.

The object "registry" performs mapping between an identifier for identifying each object (i.e., an object identifier: referred to as an "OID" hereinafter) and the name of the object. The object "interrupt vector" determines, upon occurrence of an interrupt, the type of the interrupt and calls an appropriate procedure. The object "OID manager" manages creation and deletion of OIDs. The object "thread manager" manages creation and deletion of execution threads for objects. The object "memory manager" performs a procedure for allocating or deallocating memory areas.

The object "scheduling mechanism" manages the timing of switching over the execution thread in scheduling of objects. The object "scheduling policy" manages a scheduling policy including the operation of a scheduling queue. In other words, the object "scheduling mechanism" handles procedures at a lower level of the scheduling (i.e., at a level closer to hardware), and the object "scheduling policy" handles procedures at a higher level of the scheduling (i.e., at a level closer to an application).

The object "message handler" manages a mechanism for performing message communication between application objects. More specifically, the object "message handler" performs management of a message queue and processing to confirm a message receiver when messages are communicated between application objects.

The object "basic message handler" manages a mechanism for performing message communication between application objects. More specifically, the object "basic message handler" performs management of a message queue and processing to confirm a message receiver when messages are communicated between application objects.

The object "memory switcher" switches over an active memory space in match with switchover of the execution thread from one to another by using an MMU (Memory Management Unit). The object "timer" manages interrupts of a hardware timer and also manages routine processing.

2-2 Object Execution Transition

Figure 3:
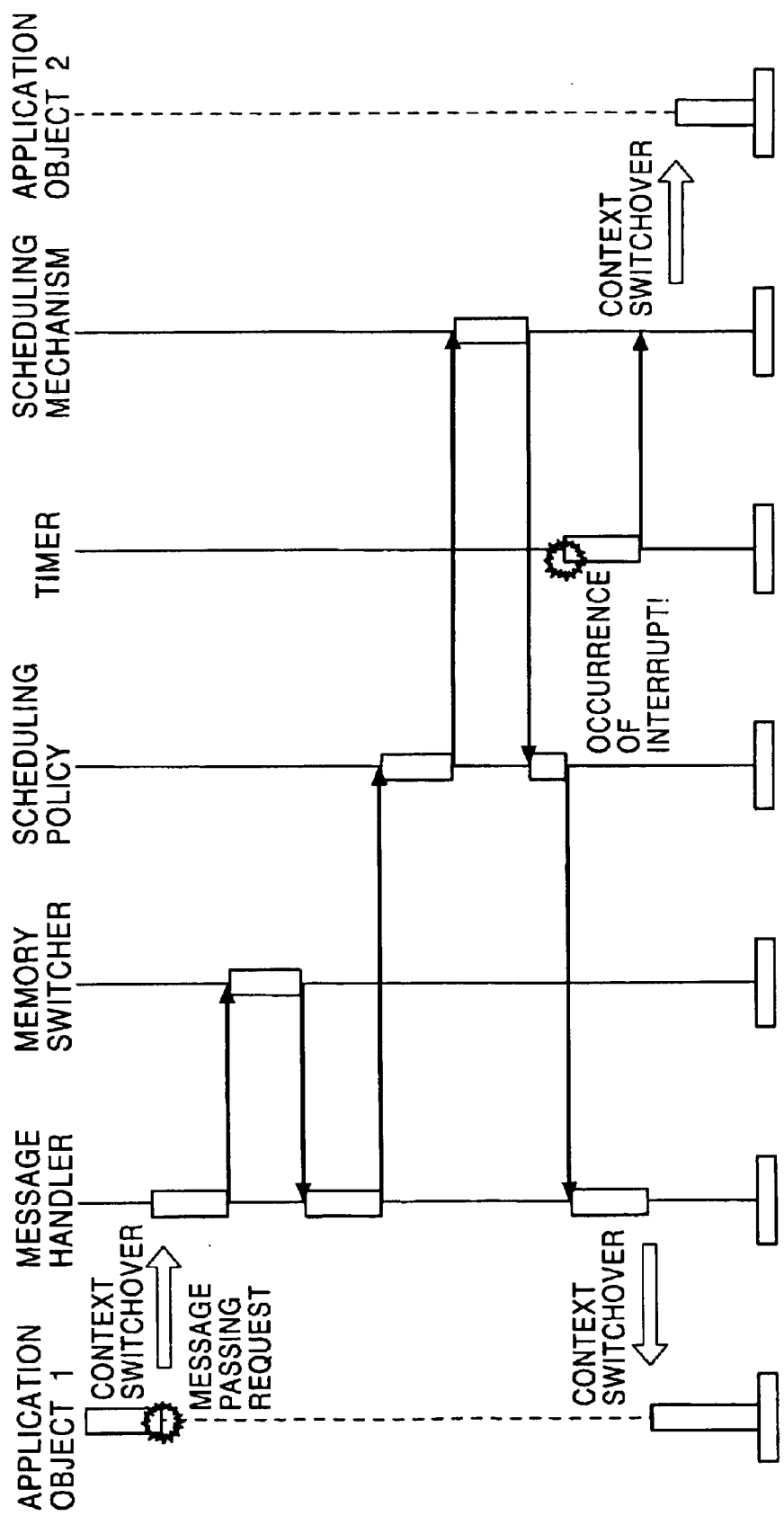
FIG. 3 is a diagram showing one example of execution transition when messages are communicated between two application objects running on the operating system.

FIG. 3 shows one example of transition in execution of system objects when messages are communicated between two application objects (application object 1 and application object 2) running on the operating system.

When a message passing (transmission) request occurs in the application object 1, switchover of the execution thread to the object "message handler" as one of the system objects first occurs. Between the application object and the system object, message communication does not take place, and only switchover of the execution thread takes place by the MetaCore. The reason is to form a boundary between the operating system and an application and to enhance system safety by switching over an operating level between the application object and the system object.

Then, the object "message handler" performs processing of a message queue for the application object 2 that is a message receiver. If any message under processing does not remain in the queue, the object "memory switcher" is started up. If another message under processing remains in the queue, a message addressed to the application object 2 is stored in the queue, and when the timing of processing that message comes, the object "memory switcher" is started up.

Then, the object "memory switcher" switches over the active memory space from a memory space for the application object 1 to a memory space for the application object 2.

Then, the object "message handler" transfers information of the execution thread for the application object 2 to the object "scheduling policy".

Then, the object "scheduling policy" and the object "scheduling mechanism" perform processing of the scheduling queue. At this time, since the execution thread for the application object 1 is necessarily present in the scheduling queue, the execution thread for the application object 2 is stored behind the execution thread for the application object 1.

Thereafter, execution control is returned to the object "message handler". Switchover of the execution thread to the application object 1 then occurs, whereupon the execution of the application object 1 is resumed.

Subsequently, the object "timer" is started up upon occurrence of a hardware interrupt, and the object "scheduling mechanism" is called by the object "timer"t. Switchover of the execution thread to the application object 2 then occurs, whereupon the application object 2 as the message receptor also starts the execution.

After that, the application object 1 and the application object 2 are executed in parallel in accordance with the time slice scheduling.

While the above example has been described in connection with the object execution transition when messages are communicated between application objects, the object execution transition takes place substantially in the same way when messages are communicated between system objects.

The object for processing message communication between system objects is however not the object "message handler", but the object "basic message handler". Also, because system objects are usually located in the same memory space, the object "memory switcher" is not started up when messages are communicated between system objects.

Figure 4:
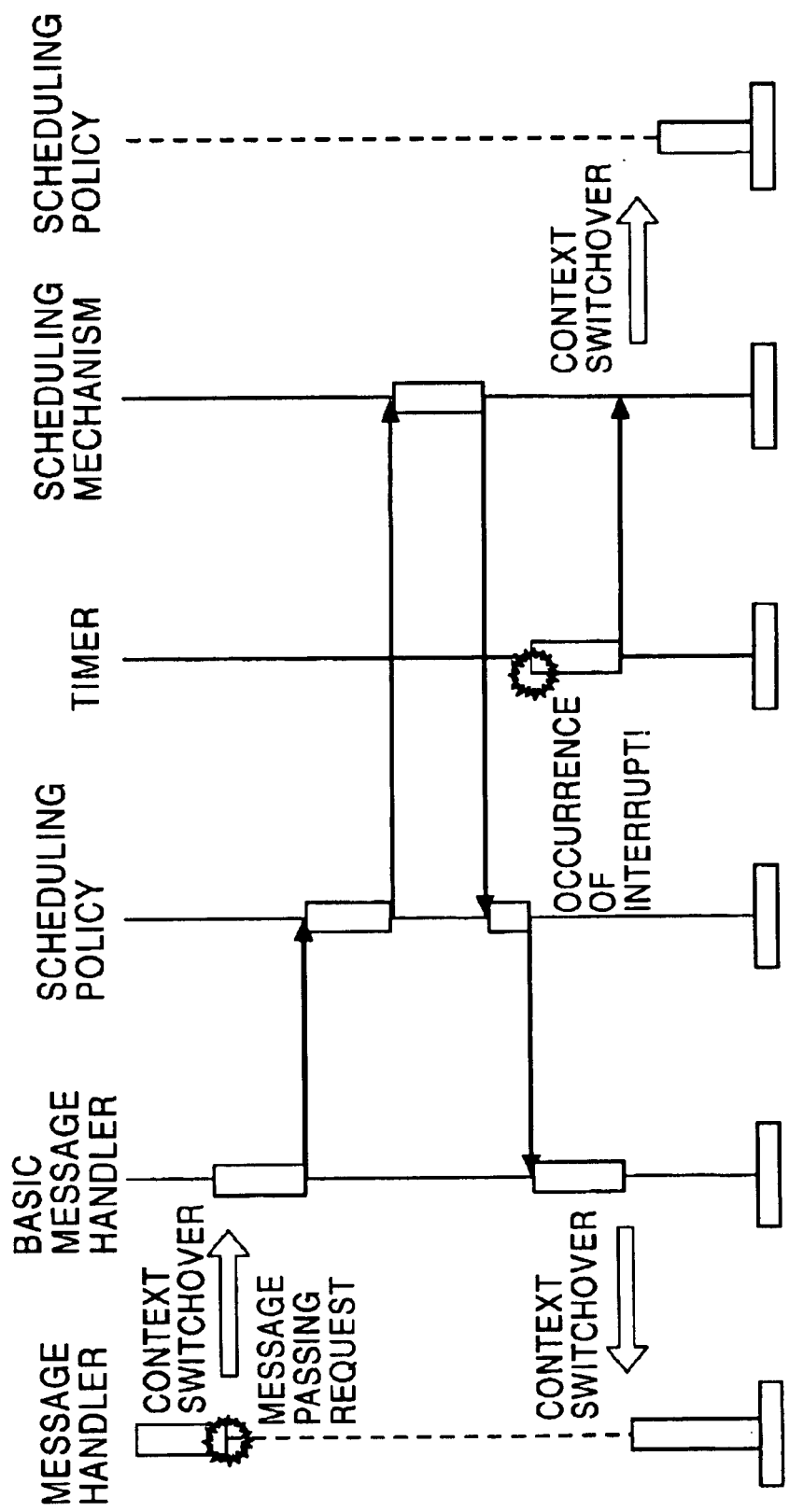
FIG. 4 is a diagram showing one example of execution transition when messages are communicated between two system objects.

As one example of execution transition when messages are communicated between system objects, FIG. 4 shows execution transition when messages are communicated between the object "basic message handler" and the object "scheduling policy".

As shown in FIG. 4, when messages are communicated between system objects, the execution transition is the same as the execution transition taking place when messages are communicated between system objects, shown in FIG. 3, except for the following points;

the execution transition is effected by not the object "message handler", but the object "basic message handler", and the object "memory switcher" is not started up.

Additionally, in the example of FIG. 4, scheduling of the object "scheduling policy" as the message receptor is carried out by the object "scheduling policy" itself. Stated otherwise, the object for carrying out scheduling of the object "scheduling policy" is also the object "scheduling policy". In order not to cause contradiction to such a model, when the object "scheduling policy" brings itself into an active state, it performs exceptional processing distinct from the processing to be executed in other cases.

2-3 Message Communication Mechanism

A mechanism for performing message communication will be described below in detail, taking as an example a concrete application program interface (referred to as an API hereinafter).

In the following description, each API is first expressed in accordance with the description method using OMG IDL (Object Management Group Interface Definition Language), and explanation of the API succeeds to the expression of the API.

2-3-1 APIs for Use in Message Communication

First, APIs for use in message communication between objects will be described in connection with concrete examples. Note that the following APIs are used in any of the case of communicating messages between application objects and the case of communicating messages between system objects. Also, in the following description, an object on the message transmitting side is referred to as a transmitting object and an object on the message receiving side is referred to as a receiving object.

Further, in the following APIs, "sError" indicates a variable type representing an error identification value. Also, "in" put before an argument type indicates an input argument, and "out" put before an argument type indicates an output argument. Moreover, "OID" is a variable type representing an OID, and "Selector" is a variable type representing a message selector corresponding to a method.

Furthermore, "FutureID" is a variable type representing an identifier of a future structure. The future structure is a structure used for establishing synchronization between the transmitting object and the receiving object. A message replied to the transmitting object as a result of the processing performed in the receiving object is stored in the future structure. The future structure is assigned with an individual identifier for identifying each future structure. Details of the future structure are described in Japanese Unexamined Patent Publication No. 10-283205 filed by the assignee of this application.

sError FindOID (in char' name, out OID' object):

This API substitutes the OID of the object corresponding to the object name given by the input argument "name" in the output argument "object". In the operating system of this embodiment, OIDs are employed for reference to objects. Then, mapping between the object name and the OID is managed by the object "registry" that is one of the system objects.

sError Send (in OID destination, in Selector method, in void' arg, out FutureID' future):

This API transmits a message from the transmitting object to the receiving object specified by the input argument "destination". Also, this API starts up a method of the receiving object specified by the input argument "method", and transfers the input argument "arg" as an argument for the method. Further, this API stores the identifier of a future structure used in message communication, as a return value, in the output argument "future".

After the receiving object has received the message, the transmitting object and the receiving object are executed in parallel. If the receiving object is under processing of another message at the time when a message is transmitted from the transmitting object to the receiving object, processing of the transmitted message is not started until the current processing is finished, and the transmitted message is stored in the message queue.

sError WaitFor (in FutureID future):

This API is to establish synchronization between the transmitting object and the receiving object. To that end, this API suspends the processing in the transmitting object until a message replied to the transmitting object as a result of the processing performed in the receiving object is stored in the future structure specified by the input argument "future". In other words, when this API is issued, the transmitting object suspends the processing until receiving a reply from the receiving object.

sError Reply ( ):

This API replies a message to the transmitting object as a result of the processing performed in the receiving object. The message replied to the transmitting object is not provided as an argument of this API, but stored in the future structure for transfer to the transmitting object. Accordingly, this API does not include an argument in which the message replied to the transmitting object is put.

void Exit ( ):

This API terminates execution of the object method. If there is a message stored in the message queue at the time when this API is issued, processing of the message is started.

Figure 5:
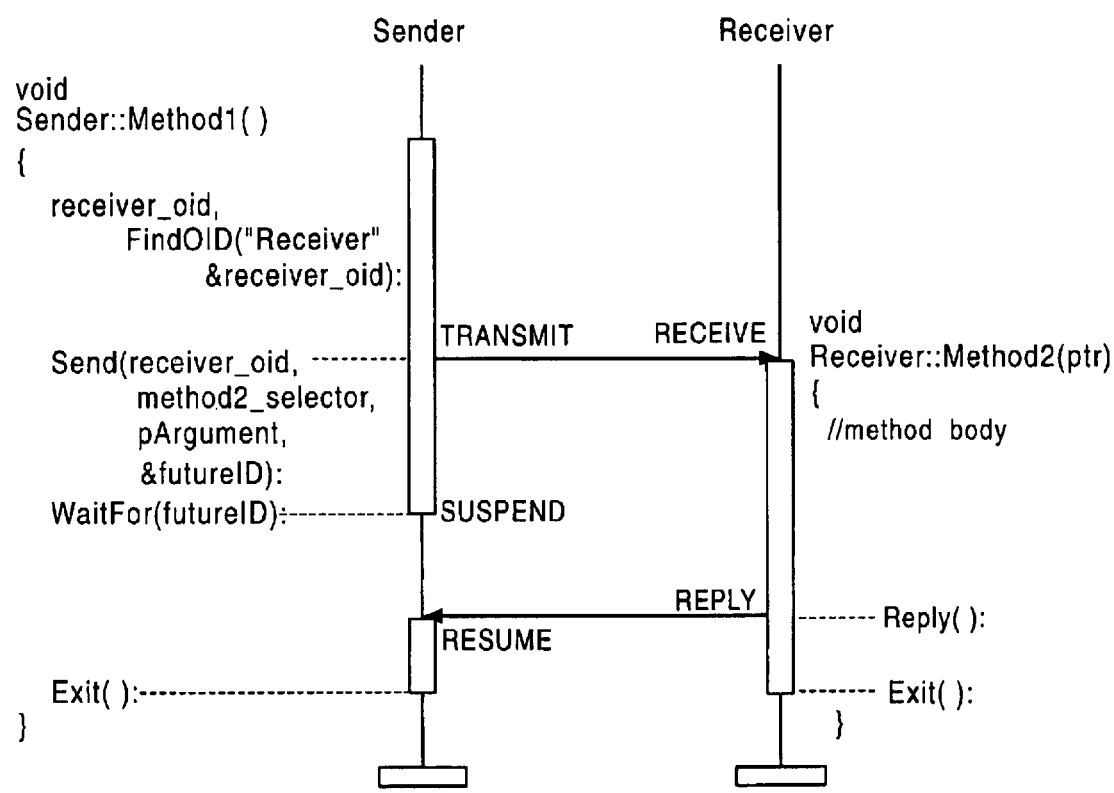
FIG. 5 is a diagram showing one example of execution transition when APIs for message communication are utilized.

FIG. 5 shows one example of execution transition using the above-mentioned APIS.

FIG. 5 shows the case of transmitting a message from the transmitting object "Sender" to the receiving object "Receiver". More concretely, FIG. 5 illustrates execution transition of processing as follows. A method "Method1 ( )" of the transmitting object "Sender" transmits a message requesting start-up of a method "Method2 (ptr)" of the receiving object "Receiver". Then, synchronization between the transmitting object "Sender" to the receiving object "Receiver" is established, a result of processing with the method "Method2(ptr)" of the receiving object "Receiver" is replied to the transmitting object "Sender".

In the example shown in FIG. 5, the OID of the object having the name "Receiver" is first substituted in the output argument "receiver_oid" by "FindOID("Receiver", &receiver_oid".

Then, a message requesting start-up of the method "Method2 (ptr)" of the receiving object "Receiver" is transmitted by "Send(receiver_oid, method2_selector, pArgument, &futureID)" from the transmitting object "Sender" to the receiving object "Receiver". At this time, the method "Method2(ptr)" of the receiving object "Receiver" is specified by the argument "method2_selector". Also, the argument "pArgument" is transferred to the method "Method2(ptr)" of the receiving object "Receiver". Further, the identifier used for identifying the future structure, which stores the message replied to the transmitting object "Sender" as a result of the processing performed in the receiving object "Receiver", is stored as a return value in the output argument "futureID".

Then, when "Send(receiver_oid, method2_selector, pArgument, &futureID)" is issued, the processing shown in FIG. 3 or 4 is executed by the system objects, whereby the receiving object "Receiver" is started up. From this point in time, the transmitting object "Sender" and the receiving object "Receiver" are executed in parallel.

Thereafter, when the transmitting object "Sender" issues "WaitFor(futureID)" and comes into a state waiting for a reply from the receiving object "Receiver", execution of the transmitting object "Sender" is suspended until the receiving object "Receiver" issues "Reply( )".

Subsequently, when the receiving object "Receiver" issues "Reply( )" and passes a reply to the transmitting object "Sender", execution of the transmitting object "Sender" is resumed, thus causing the transmitting object "Sender" and the receiving object "Receiver" to run in parallel. A message replied from the receiving object "Receiver" to the transmitting object "Sender" is transferred via the future structure.

After performing the message communication as described above, the processing in each of the transmitting object "Sender" and the receiving object "Receiver" is ended by issuing "Exit)".

2-3-2 External Interface of Object

An object method is usable as an external interface by registering the method in an entry table. An external interface of an object means a method open to other objects, i.e., a method that can be started up from other objects via message communication. In the example of FIG. 5, the method "Method2(ptr)" of the receiving object "Receiver" is one external interface.

Figures 6, 7:
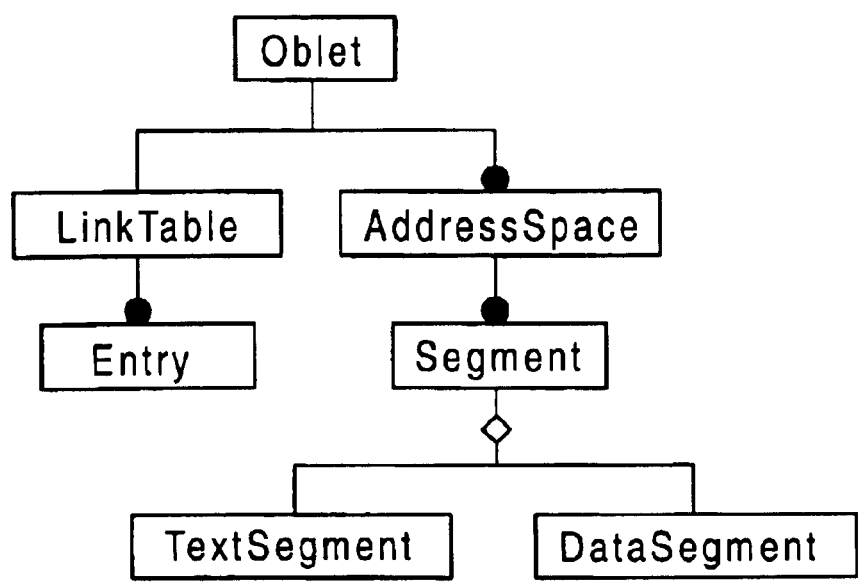
FIG. 6 is a representation showing one example of an entry table.
FIG. 7 is a representation showing the structure of an Oblet in the form of an OMT diagram.

As shown in FIG. 6, the entry table is a table comprising two sets of message selectors and entries, and is held in each object in one-to-one relation. Here, the entry is a pointer to a method. The entry table is referenced by the system object to search for a method when the object is started up.

APIs used for performing such processing as to register a method in the entry table will be described below in connection with a concrete example. Note that while the following APIs are primarily used in a method (referred to as a "prologue method" hereinafter) called at the time of initializing an object, they may be called from any desired method and employed when external interfaces are registered in a dynamic way.

In the following APIS, "sError" indicates a variable type representing an error identification value. Also, "in" put before an argument type indicates an input argument, and "out" put before an argument type indicates an output argument. Moreover, "EntryTable" is a variable type representing a pointer to an entry table, and "Selector" is a variable type representing a message selector corresponding to a method.

sError InitEntryTable (in EntryTable table):

This API registers an entry table in an object. A pointer to the entry table registered in the object is set in the input argument "table". The contents of the entry table specified by the pointer are registered in the object, and methods registered in the entry table are usable as external interfaces.

sError GetEntryTable (out EntryTable table):

This API gets the contents of the entry table registered in the object in the form of an entry table. A pointer to the entry table is stored in the output argument "table".

void EntryTable::SetEntry (in Selector method, in Entry entry);

This API registers values of message selectors and entries in the entry table. A message selector to be registered is set in the input argument "method", and an entry to be registered is set in the input argument "entry".

void EntryTable::UnsetEntry (in Selector method);

This API deletes values from the entry table. A message selector of the method to be deleted is set in the input argument "method".

One example (method name "Prologue") of the prologue method employing the above-described APIs is shown below as a code 1.

Code 1: Registration of External Interface

1: void
2: Prologue ( )
3: {
4: EntryTable entryTable (2);
5:
6: entryTable.SetEntry (selector1, Method1);
7: entryTable.SetEntry (selector2, Method2);
8:
9: InitEntryTable (&entryTable);
10:}

The above method "Prologue" is a prologue method for registering a method as an external interface at the time of initializing an object. In the method "Prologue", an entry table having two entries is defined in line 4, and values of message selectors and entries are registered respectively in the entry table in lines 6 and 7. Then, the entry table including the registered values of message selectors and entries is registered in line 9 in the object that has issued the prologue method. As a result, the methods registered in the entry table become usable as external interfaces.

Furthermore, another example (method name "ChangeExternalInterface") of the prologue method employing the above-described APIS is shown below as a code 2.

Code 2: Change of External Interface

1: void
2: ChangeExternalInterface ( )
3: {
4: EntryTable* pEntryTable;
5:
6: GetEntryTable (pEntryTable);
7:
8: entryTable.UnsetEntry (selector1);
9: entryTable.SetEntry (selector3, Method1);
10:
11: InitEntryTable (pEntryTable);
12:}

With the above method "ChangeExternalInterface", the methods registered by the foregoing method "Prologue" (code 1) are changed such that registration of the method "Methods1" as an external interface is deleted and an entry "Method3", which is to be referenced by a message selector "selectors3, is newly registered instead. In the method "ChangeExternalInterface", a pointer to the entry table used for entry exchange is stored in "EntryTable* pEntryTable" defined in line 4. Then, in the method "ChangeExternalInterface", the pointer to the entry table is acquired in line 6, the entry of the message selector "selector1" is deleted in line 8, and a new entry is registered in line 9. Then, the contents of the changed entry table are registered in the object again in line 11.

2-4 Dynamic Link Mechanism

A dynamic link mechanism will be described below. The dynamic link mechanism is used when constructing a common library (referred to as a dynamic common library hereinafter) that can be dynamically linked between objects, or is used as part of a later-described mechanism for dynamically changing a composite object.

The dynamic link mechanism is a mechanism for constituting objects with a plurality of software modules called "Oblets". The structure of an Oblet will be described using an OMT (Object Modeling Technique) diagram shown in FIG. 7.

An Oblet is made up of a link table ("LinkTable") and any desired number of address spaces ("AdressSpace"). The link table is a set of entries ("Entry") (each entry is a pointer to a method in a text segment described later). The address space is a unit set for memory protection, and comprises a plurality of segments ("segment"). Then, an execution binary text (code) area and a data area are usually defined in the Oblet as a text segment (mTextSegement"t) and a data segment ("DataSegment"), respectively. Thus, a method is stored in the text segment, and an entry in the link table serves as a pointer to the method stored in the text segment.

All the objects have entry tables, but the destination indicated by an entry (pointer to a method) stored in the entry table may be an entry in the text segment or an entry in the link table. Where an entry stored in the entry table of some object indicates an entry in the link table, the contents of a text segment in an Oblet having that link table are used as methods of that object.

Figure 8:
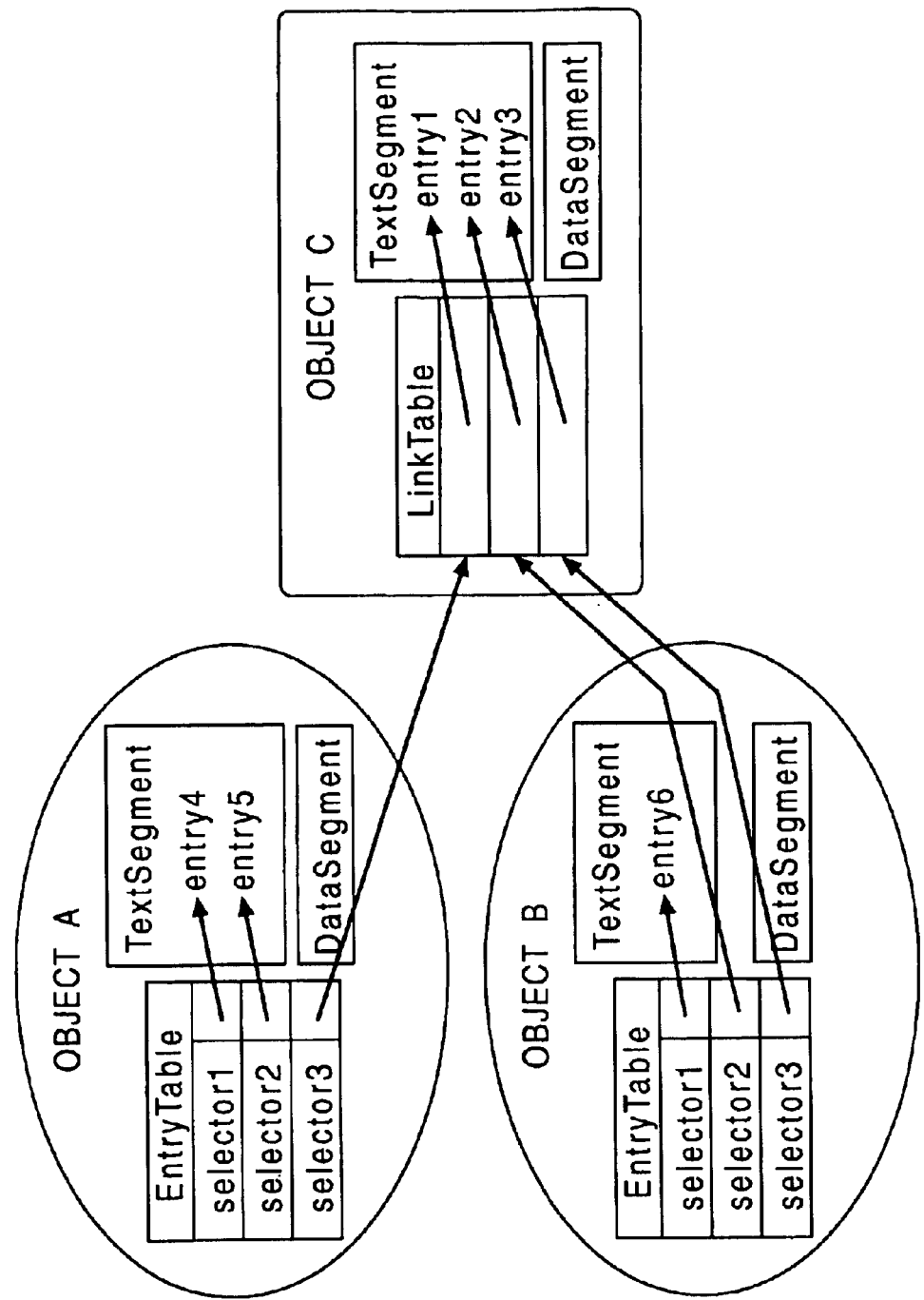
FIG. 8 is a representation showing an example in which an object A and an object B employ a dynamic common library using an Oblet C.

By utilizing such a dynamic link mechanism, it is possible to construct a common library that can be dynamically linked between objects, i.e., a dynamic common library. FIG. 8 shows an example in which an object A and an object B employ a dynamic common library using an Oblet C.

The object A includes an entry table having three entries. Of these three entries, the entries corresponding to message selectors "selector1" and "selector2" are entries pointing to methods in a text segment of the object A. Further, the entry corresponding to a message selector "selector3" points to an entry in a link table of the Oblet C, and the entry in the link tables is an entry pointing to a method in a text segment of the Oblet C.

On the other hand, an entry table of the object B also has three entries. Of these three entries, the entry corresponding to a message selector "selector1" is an entry pointing to a method in a text segment of the object B. Further, the entries corresponding to message selectors "selector2" and "selectors3"point to entries in the link table of the Oblet C, and the entries in the link tables are entries pointing to methods in the text segment of the Oblet C.

In this case, the Oblet C is a common library linked from the object A and the object B. By updating, for example, the Oblet C as a common library, therefore, operations of the object A and the object B can be updated at the same time. Also, a link to the link table of the Oblet C can be dynamically changed. Stated otherwise, the Oblet C serves as a common library that can be dynamically linked between objects, i.e., a dynamic common library.

In the case of employing an Oblet as a dynamic common library, "Oblet information" extracted so as to indicate what kinds of entries are stored in a link table of the Oblet is provided at the time of defining the Oblet. In the object initializing procedure, if the entry name in a library referenced by an object is compared with the entry name in the Oblet information and both the entries coincide with each other, a link is extended from an entry table of the object to a link table of the Oblet.

Incidentally, utilization of such a dynamic link mechanism to a composite object will be described later.

2-5 Composite Object

A composite object will be described below. The composite object is a core point of the present invention. By introducing the composite object, a cost of communication between objects can be reduced while maintaining flexibility of the operating system.

2-5-1 Concept of Composite Object

A composite object ("Compositeobject") is an object having properties as follows.

(1) A composite object comprises a plurality of component objects ("ComponentObject").

(2) The programming style of a composite object is the same as an object (referred to as a standard object ("StandardObject") hereinafter) other than the component object. In other words, similarly to standard objects, component objects are also defined as entities between which a message is passed through message communication using APIs. Further, the component object and the standard object employ the same programming style for the initializing procedure with a prologue method.

(3) Each component object has an OID similarly to each standard object. The OID can be referenced from other component objects and standard objects.

(4) Component objects in a composite object have not their own execution threads, but share an execution thread possessed by the composite object.

(5) A composite object comprises a plurality of component objects, and message communication between the component objects is faster than that between standard objects. The reason is that when communicating a message between the component objects making up the composite object, switchover of the execution thread does not take place and communication between the component objects is performed in a similar control flow as when calling a function.

(6) Two objects can be component objects to make up a composite object when there is a "sequential execution relation" between both the objects. Concretely, if the following two conditions are satisfied, it can be determined that there is a sequential execution relation between two objects;

(a) at the time when a message is transmitted from one object to the other object, the two objects are not required to run in parallel, and (b) at the time when a message is transmitted from one object to the other object, the object on the message receiving side is never under processing of another message.

(7) A composite object can be converted into a standard object, and a standard object can be converted into a composite object.

(8) An external interface of the component object serves also as an external interface of the composite object.

(9) Component objects making up a composite object can be decided at initialization of the composite object, and also dynamically added or deleted later.

Figure 9:
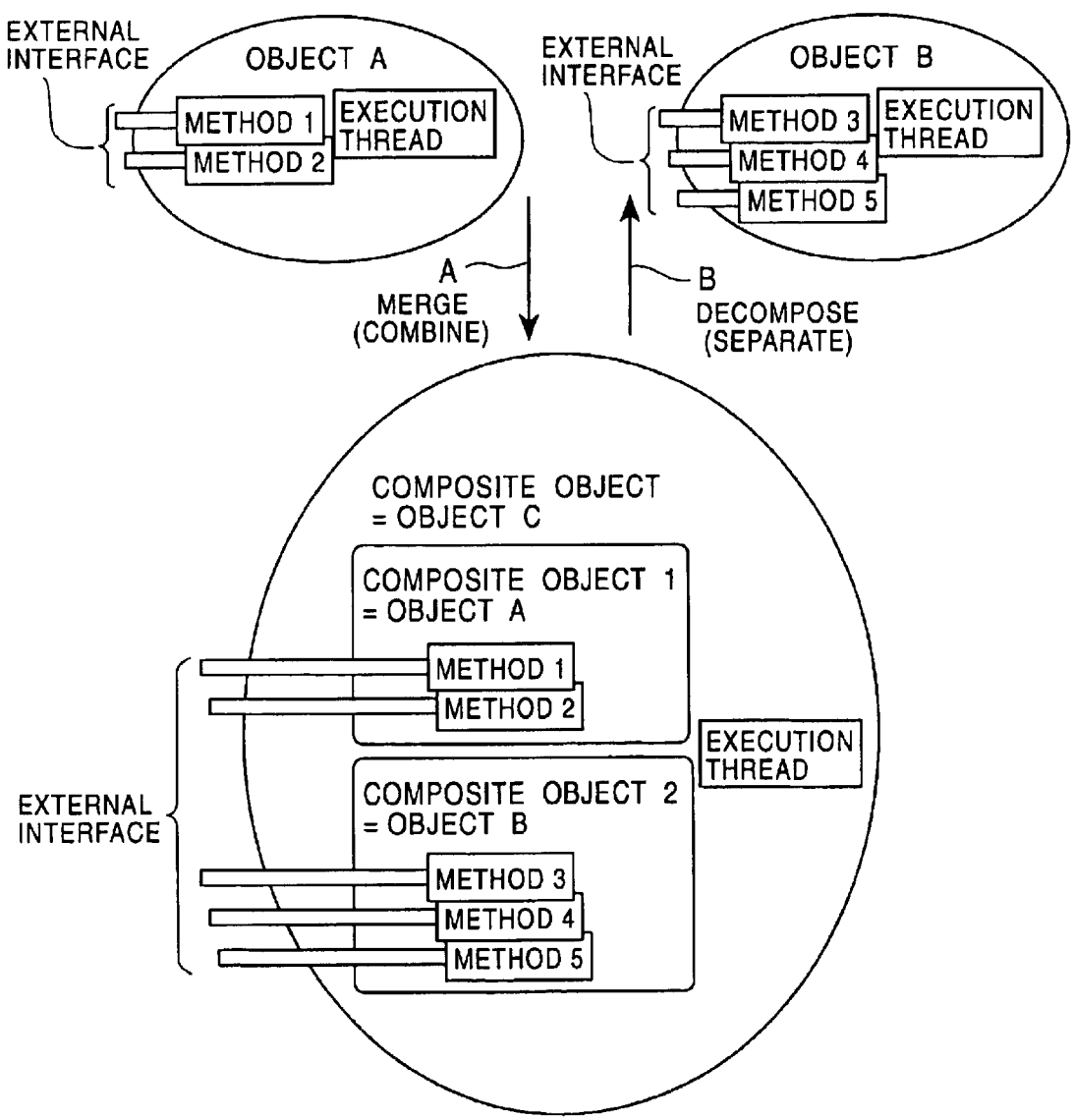
FIG. 9 is a representation showing an example in which a composite object "object C" is constituted from two standard objects "object A and object B"

FIG. 9 shows an example in which a composite object "object C" is constituted from two standard objects "object A" and "object B". In the example of FIG. 9, two methods, i.e., methods 1 and 2, are defined as external interfaces in the object A. Also, three methods, i.e., methods 3, 4 and 5, are defined as external interfaces in the object B.

As indicated by arrow A in FIG. 9, the composite object C can be constituted by merging and combining the object A and the object B. In this case, the object A and the object B serve as component objects of the composite object C, and the methods 1, 2, 3, 4 and 5 serve as external interfaces of the composite object C. These external interfaces are the same as those provided when the object A and the object B are standard objects.

Also, when the object A and the object B are constituted as component objects of the composite object C, these component objects have their own OIDs. Similarly to standard objects, therefore, these component objects can be therefore referenced from other component objects and standard objects.

Further, when the object A and the object B are constituted as component objects of the composite object C, these component objects share the execution thread of the composite object C.

Additionally, as indicated by arrow B in FIG. 9, the component objects making up the composite object C can be returned to standard objects by decomposing and separating the object C.

In this connection, when rendering standard objects to serve as component objects making up a composite object, it is important that there is a sequential execution relation between the objects.

Assume, for example, that three standard objects A, B and C are present, a sequential execution relation does not exist between the object A and the object B (that is, a parallel execution relation exists between the object A and the object B), and a sequential execution relation exists between the object A and the object C. In this case, a composite object cannot be constituted by combining the object A and the object B. On the other hand, a composite object can be constituted by combining the object A and the object C.

Therefore, the object A and the object B are employed as they are, i.e., as standard object, even when both the objects are employed in a combined manner. On the other hand, the object A and the object C can be employed as component objects making up a composite object when both the objects are employed in a combined manner.

Thus, by separately employing a standard object and a composite object in consideration of a sequential execution relation between objects, the system performance can be improved.

2-5-2 Realization of Composite Object with Dynamic Link Mechanism

In order that a component object can be flexibly added or deleted as with a standard object, a dynamic link mechanism is used for realizing the component object.

Figure 10:
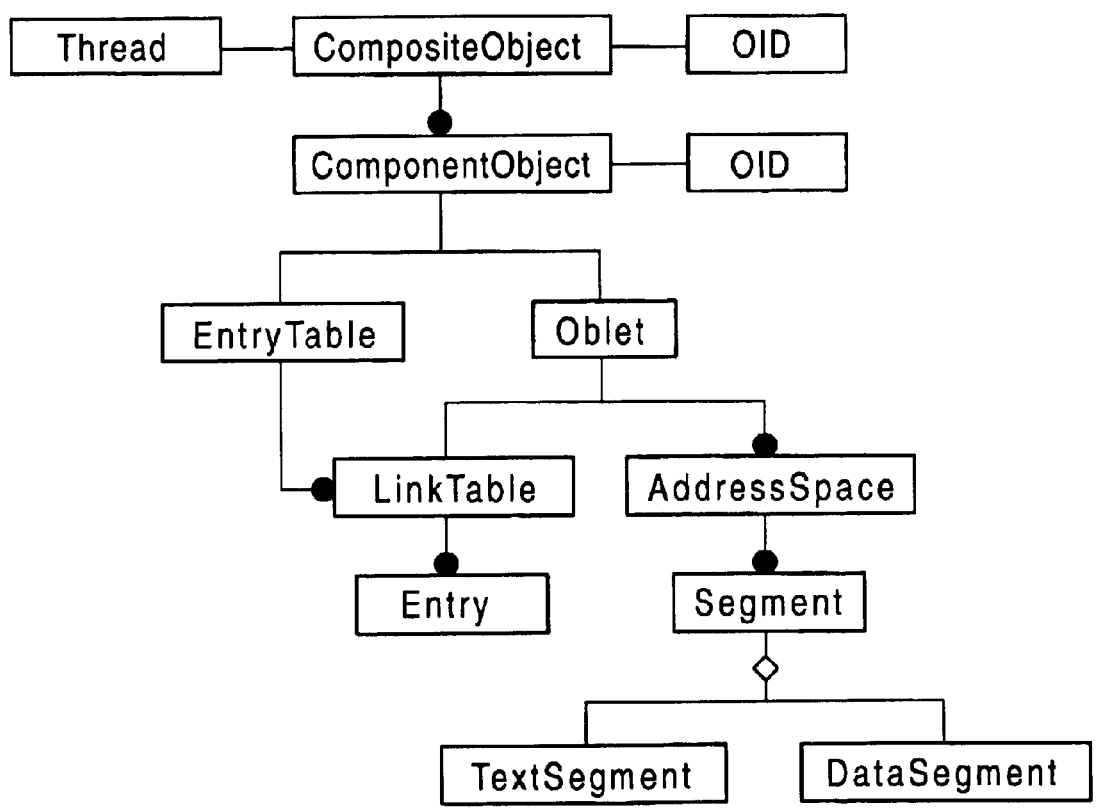
FIG. 10 is a representation showing the structure of a composite object in the form of an OMT diagram.

FIG. 10 is an OMT diagram showing the structure of a composite object. As shown in FIG. 10, a composite object ("CompositObject") comprises any desired number of component objects ("ComponentObject"). Each component object has its own OID. The composite object also has one OID. The composite object has one execution thread ("Thread"). Each component object is made up of an Oblet ("Oblet") and an entry table ("EntryTable"). The Oblet has a structure as described above with reference to FIGS. 7 and 8. There are a plurality of references made from the entry table to a link table. This Oblet structure corresponds to a special one of the structure of a dynamic common library described above in chapter 2-4, i.e., a structure taken when the Oblet is not shared as a library. Accordingly, the Oblet in this case is initialized by the same scheme as the dynamic common library.

A standard object is also constituted using a dynamic common library. Therefore, a standard object and a composite object can be constructed to have a structure common to both the objects, whereby system processing can be simplified.

Figure 11:
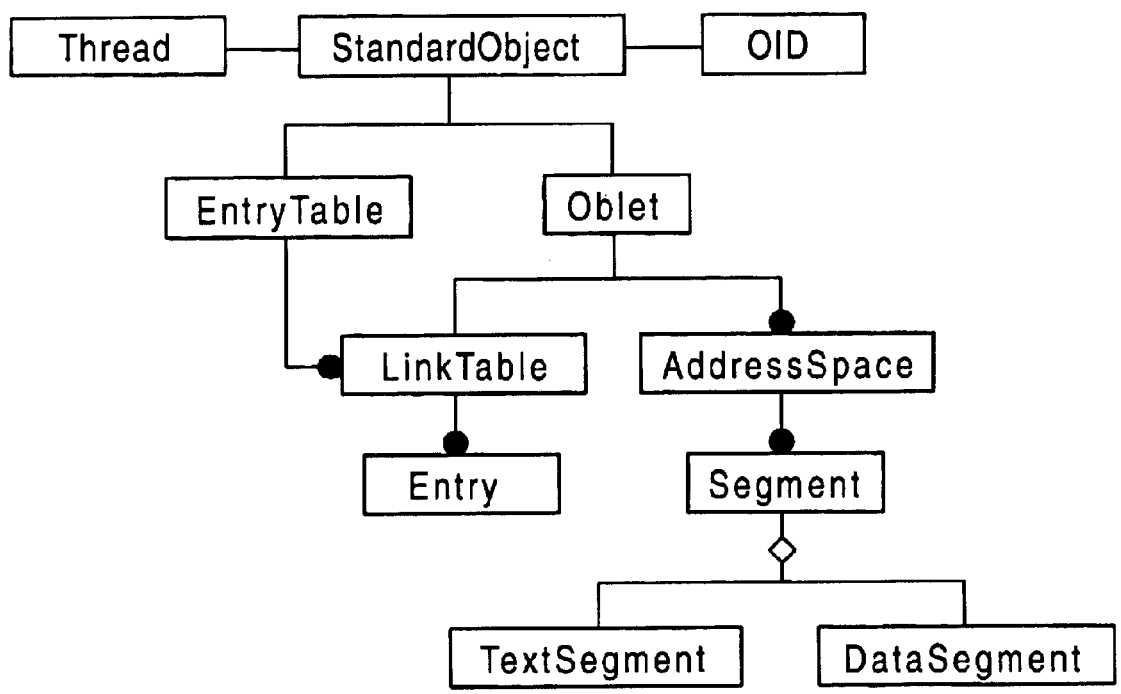
FIG. 11 is a representation showing the structure of a standard object in the form of an OMT diagram.

FIG. 11 is an OMT diagram showing the structure of a standard object. As shown in FIG. 11, a standard object ("StandardObject") has one OID and one execution thread ("Thread"). Also, the standard object has an Oblet ("Oblet"f) and an entry table ("EntryTable"). Accordingly, the structure of the standard object corresponds to a special one of the structure of a composite object, i.e., a structure taken when the composite object has only one component object. However, only one OID is assigned to the standard object.

2-5-3 Initializing Algorithm of Composite Object

Figure 12:
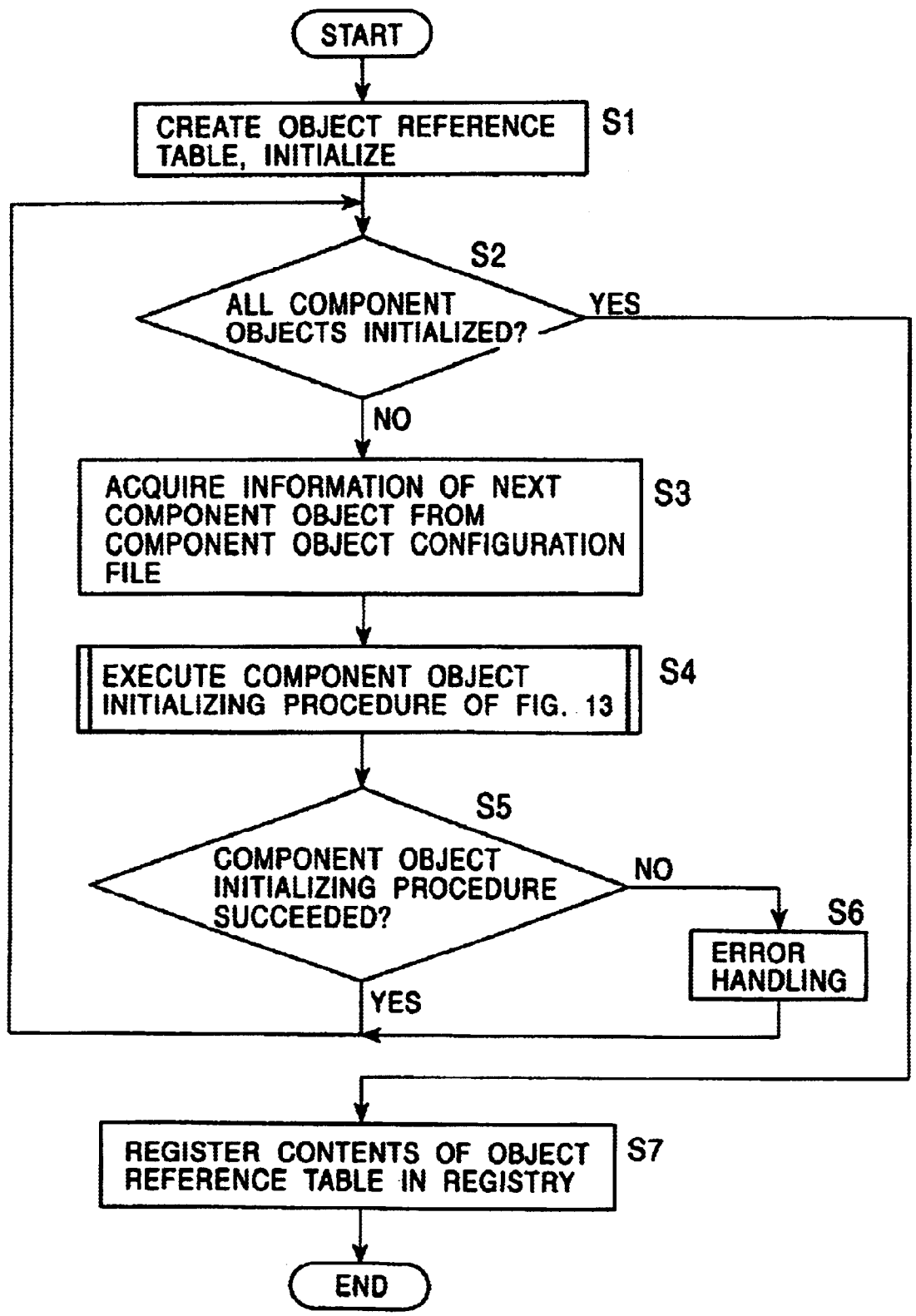
FIG. 12 is a flowchart showing a processing sequence of the composite object initializing procedure.
Figure 13:
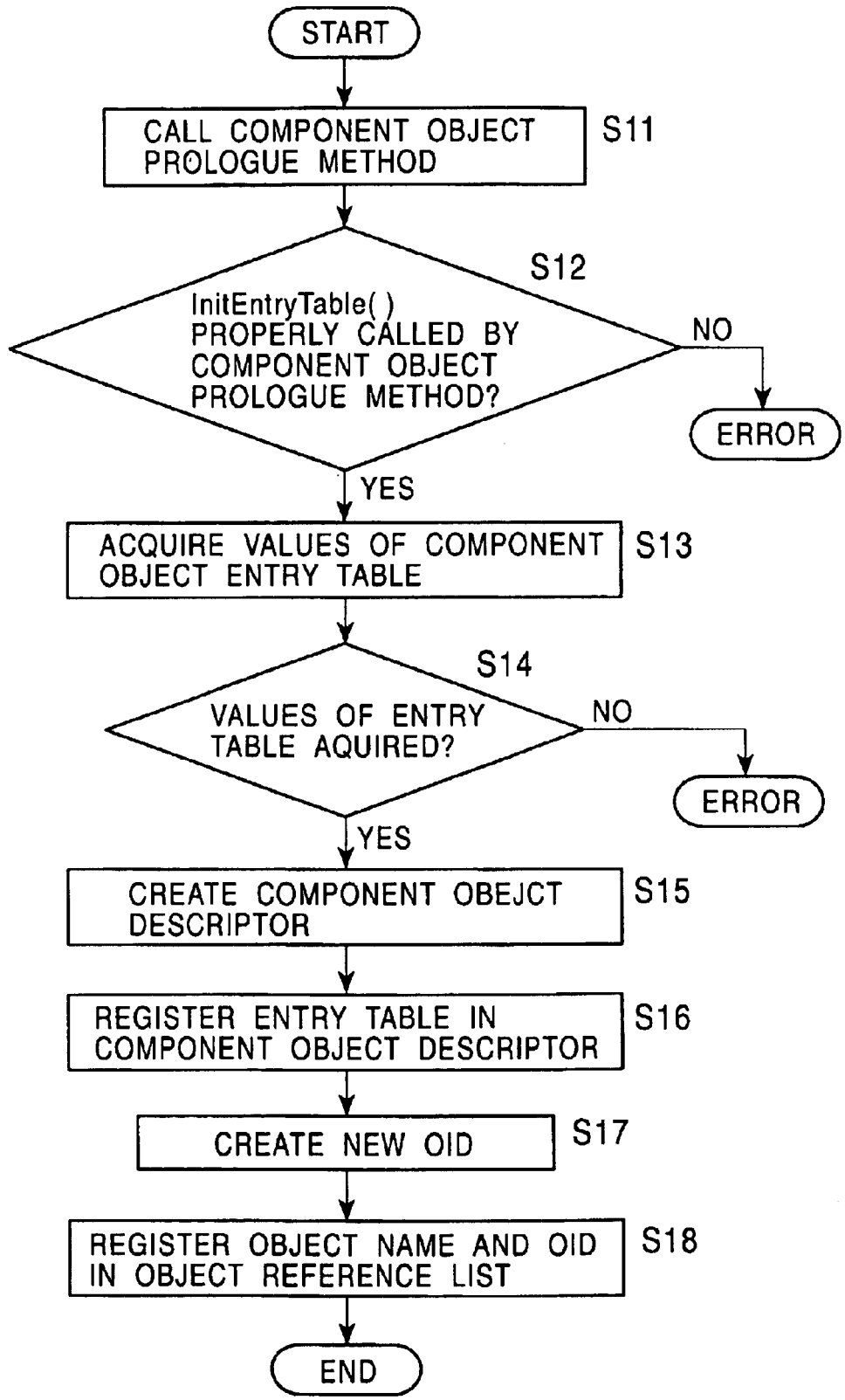
FIG. 13 is a flowchart showing a processing sequence of the initializing procedure for a component object contained in a composite object.

The composite object is executed in the same manner as the standard object after initialization, but is initialized in accordance with a different procedure from the standard object. FIG. 12 shows an initializing procedure of the composite object, and FIG. 13 shows an initializing procedure of a component object included in the composite object.

The initializing procedure of the standard object is performed by calling a prologue method and executing the prologue method. The composite object also has a prologue method, and is initialized by calling the prologue method. However, the initializing procedure of the composite object differs from that of the standard object and is performed as shown in FIGS. 12 and 13.

In the initializing procedure of the composite object, as shown in FIG. 12, an object reference table (i.e., a table for referring to the OID from the object name) is first created and initialized in step S1. The object reference table is used only within the composite object. However, since the contents of the object reference table are registered in a registry at the last of the initializing procedure as described later, the object reference table can be eventually referenced from the outside of the composite object as well.

Then, in step S2, whether the initializing procedure is completed or not is determined for all of the component objects making up the composite object. If there is a component object for which the initializing procedure is not yet completed, the processing goes to step S3. If the initializing procedure is completed for all of the component objects, the processing goes to step S7.

At the time of executing the initializing procedure of the composite object, information indicating which component objects are included in that composite object has been described in a "component object configuration file" beforehand. Concretely, the names of the component objects, the number of entries of each component object, and an entry point for a prologue method of each component object are stored in the component object configuration file.

One example of the component object configuration file is shown below as a code 3. Note that, in the following example, the component object configuration file is described using structures of the programming language C++. Code 3: Component Object configuration File

```
1: componentObjectConfiguration [ ]={
2: /* name, entry_num, prologue-method */
3: {"SchedulerPolicy", 8, _SchedPolicyPrologue},
4:         {"SchedulerMechanism",         4,
   _SchedMechanismPrologue},
5: {"Timer", 3, _TimerPrologue}
6:}
```

The above-listed code 3 shows that three component objects having the names ("SchedulerPolicy"), ("SchedulerMechanism") and ("Timer") have eight, four and three entries, and also have prologue methods (_SchedPolicyPrologue), (_SchedMechanismPrologue) and (_TimerPrologue), respectively.

Then, in step S3, information of the component object, which is to be next initialized, is acquired from the component object configuration file mentioned above.

Then, in step S4, the initializing procedure of the component object is performed, as shown in FIG. 13, based on the information acquired in step S3. The initializing procedure of the component object will be described later in detail with reference to FIG. 13.

Then, in step S5, it is determined whether the initializing procedure of the component object in step S4 has succeeded. If the initializing procedure of the component object has succeeded, the procedure returns to step S2 and repeats the subsequent processing. On the other hand, if the initializing procedure of the component object has failed, the processing goes to step S6 in which error handling such as to delete intermediate products is carried out, and thereafter returns to step S2.

If the initializing procedure has been completed for all of the component objects as a result of repeating the above-described processing, the processing skips from step S2 to step S7 as described above. In step S7, the contents of the object reference table are registered in a registry, thereby ending the initializing procedure of the composite object.

The initializing procedure as shown in FIG. 12 may be described for each composite object, but it is preferably provided as a library. Because most composite objects execute a similar initializing procedure, programming can be lessened by providing the initializing procedure as shown in FIG. 12 as a library.

The initializing procedure of each component object will be next described with reference to FIG. 13. The initializing procedure described below is executed in above step S4.

In the initializing procedure of the component object, as shown in FIG. 13, the prologue method of the component object is first called instep S11. The prologue method of the component object is described in the same programming style, shown in the code 1 in chapter 2-3-2, as the standard object, and an external interface is registered by the prologue method.

It is to be noted that the prologue method of the component object has the same programming style as that of the standard object, but there is a slight difference in processing of "InitEntryTableof( )" between when the standard object is initialized and when the component object is initialized. More specifically, when the standard object is initialized, the contents of the entry table are directly registered in the object by the processing of "InitEntryTable( )". On the other hand, when the component object is initialized, the contents of the entry table are once stored in a temporary memory area and subsequently registered in the component object by the processing of "InitEntryTable( )".

Thus, by slightly changing the processing of "InitEntryTable( )" between when the standard object is initialized and when the component object is initialized, the prologue methods can be provided in the same programming style for both the standard object and the component object. In other words, the reason why the processing of "InitEntryTable( )" is made slightly different between when the standard object is initialized and when the component object is initialized, is to enable the prologue method of the standard object and the prologue method of the component object to have the same programming style.

Then, after control is returned from the prologue method called in step S11, it is checked in step S12 whether "InitEntryTable( )" is properly called in the processing of the prologue method. This point can be confirmed by examining the temporary memory area in which the contents of the entry table are stored. If "InitEntryTable( )" is not called even once or is called plural times, an error notice is replied.

On the other hand, if "InitEntryTable( )" is properly called in the processing of the prologue method, the processing goes to step S13 in which the contents of the entry table stored in the temporary memory area are acquired.

Then, in step S14, it is checked whether the contents of the entry table stored in the temporary memory area have been acquired. If the contents of the entry table corresponding to the component object under initialization are not stored in the temporary memory area and the contents of the entry table cannot be acquired, an error notice is replied.

On the other hand, if the contents of the entry table have been acquired, the processing goes to step S15 in which a "component object descriptor" is created. The component object descriptor is a structure in which the entry table of the component object and so on are stored. The component object descriptor will be explained in detail later in chapter 2-5-4.

Then, in step S16, the entry table is registered in the component object descriptor. More specifically, an entry table is first created, and the contents of the entry table stored in the temporary memory area are then copied in the created entry table. Thereafter, the entry table including the copied contents is registered in the component object descriptor.

Then, in step S17, an OID of the component object is created.

Then, in step S18, the object name and the OID are registered in the object reference list.

Through the processing described above, the initializing procedure of the component object is completed and the processing of step S4 in the initializing procedure of the composite object shown in FIG. 12 is completed.

If an error arises during the above-described initializing procedure of the component object, the processing goes to step S6 in the initializing procedure of the composite object shown in FIG. 12.

2-5-4 Object Descriptor

A descriptor for storing object information will be explained with reference to an OMT diagram of FIG. 14.

Figure 14:
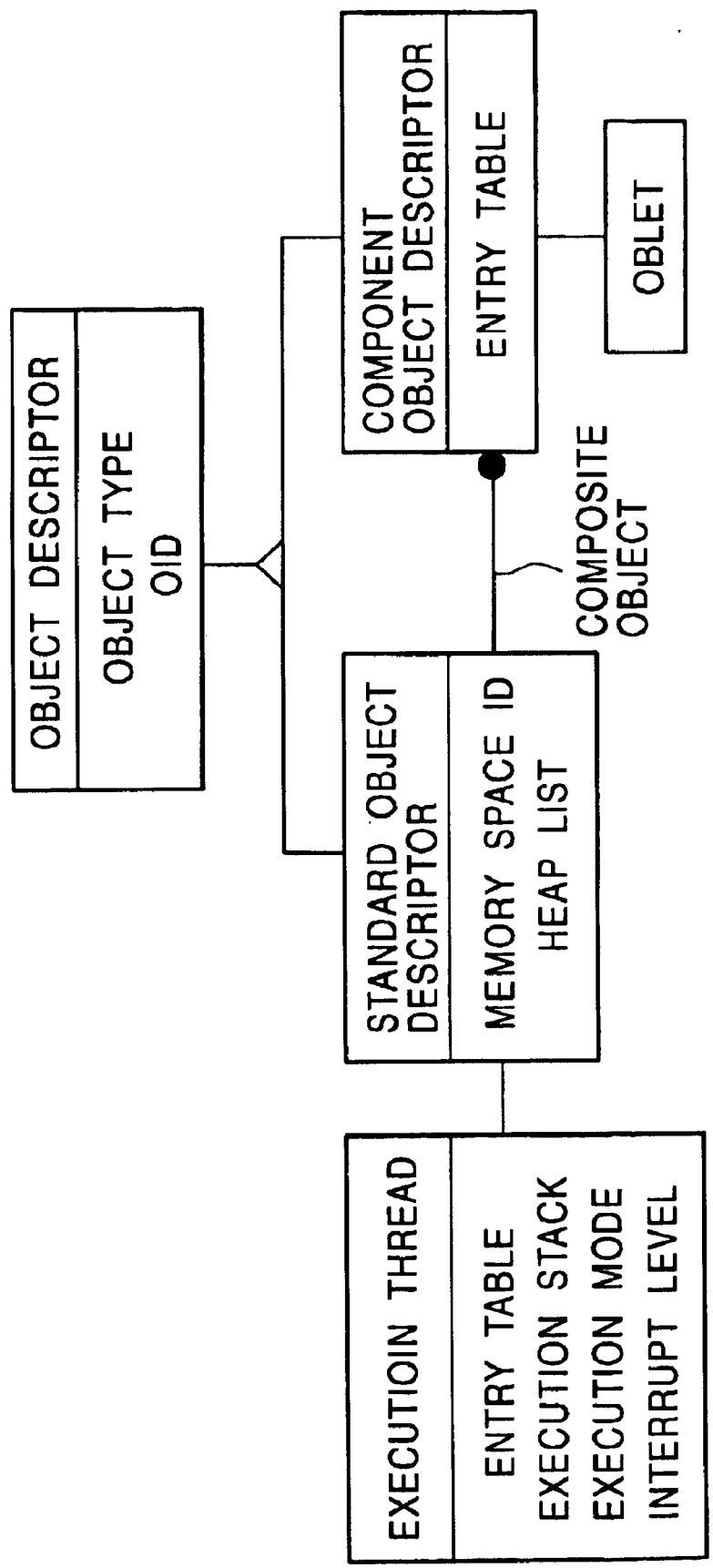
FIG. 14 is a representation showing an object descriptor, which stores object information, in the form of an OMT diagram.

As shown in FIG. 14, three kinds of classes, i.e., "object descriptor", "standard object descriptor" and "component object descriptor", are defined. The class "object descriptor" is an abstract class, while the "standard object descriptors" and the "component object descriptor" are subclasses of the class "object descriptor".

The object descriptor has "object type" and "OID".

A flag indicating whether the corresponding object is a standard object or a-component object is stored in the "object type" of the object descriptor, and the OID of the corresponding object is put in the "OID" of the object descriptor.

The standard object descriptor is a structure for storing information of the standard object. One standard object holds one standard object descriptor. Also, the composite object holds one standard object descriptor.

The standard object descriptor has "execution thread", "memory space ID", and "heap list". The identifier of a memory space that is used by the corresponding standard object is stored in the "memory space ID" of the standard object descriptor, and a list of heap memory areas that are used by the corresponding standard object is stored in the "heap list".

Further, as information regarding the execution thread of the corresponding standard object, "entry table", "execution stack", "execution mode" and "interrupt level" are stored in the "execution thread" of the standard object descriptor. The "execution mode" indicates whether the corresponding object is in a privileged instruction mode, and the "interrupt level" indicates the priority sequence of interrupts.

The component object descriptor is a structure for storing information of the component object. One component object holds one component object descriptor.

The component object descriptor has "standard object descriptor" corresponding to the composite object to which the corresponding component object belongs, "entry table" of the corresponding component object, and "Oblet" including a link table, etc. The Oblet structure is as described above with reference to FIGS. 7 and 8. Then, values are written in the component object descriptor during the initializing procedure of the composite object as described above in chapter 2-5-3 with reference to FIG. 13.

2-5-5 Message Communication Mechanism in Consideration of Composite Object

The programming style used in communicating a message between component objects and the programming style used in communicating a message between a component object and a standard object are each the same as the programming style used in communicating a message between standard objects. In other words, programming is performed using the APIs described above in chapter 2-3-1 when a message is communicated between component objects and when a message is communicated between a component object and a standard object. In message communication between component objects, however, it is required to consider the fact that there is a sequential execution relation between the objects, as described above in chapter 2-5-1.

Thus, to keep compatibility in programming style, a composite object made up of a plurality of component objects must be taken into consideration.

A message communication mechanism which enables a message to be communicated in consideration of a composite object, while keeping compatibility in programming style, will be described below in detail. The following description is made separately of the case where the object on the message transmitting side is a component object and the case where the object on the message transmitting side is a standard object.

(1) Case where Object on Message Transmitting Side is Component Object

Figure 15:
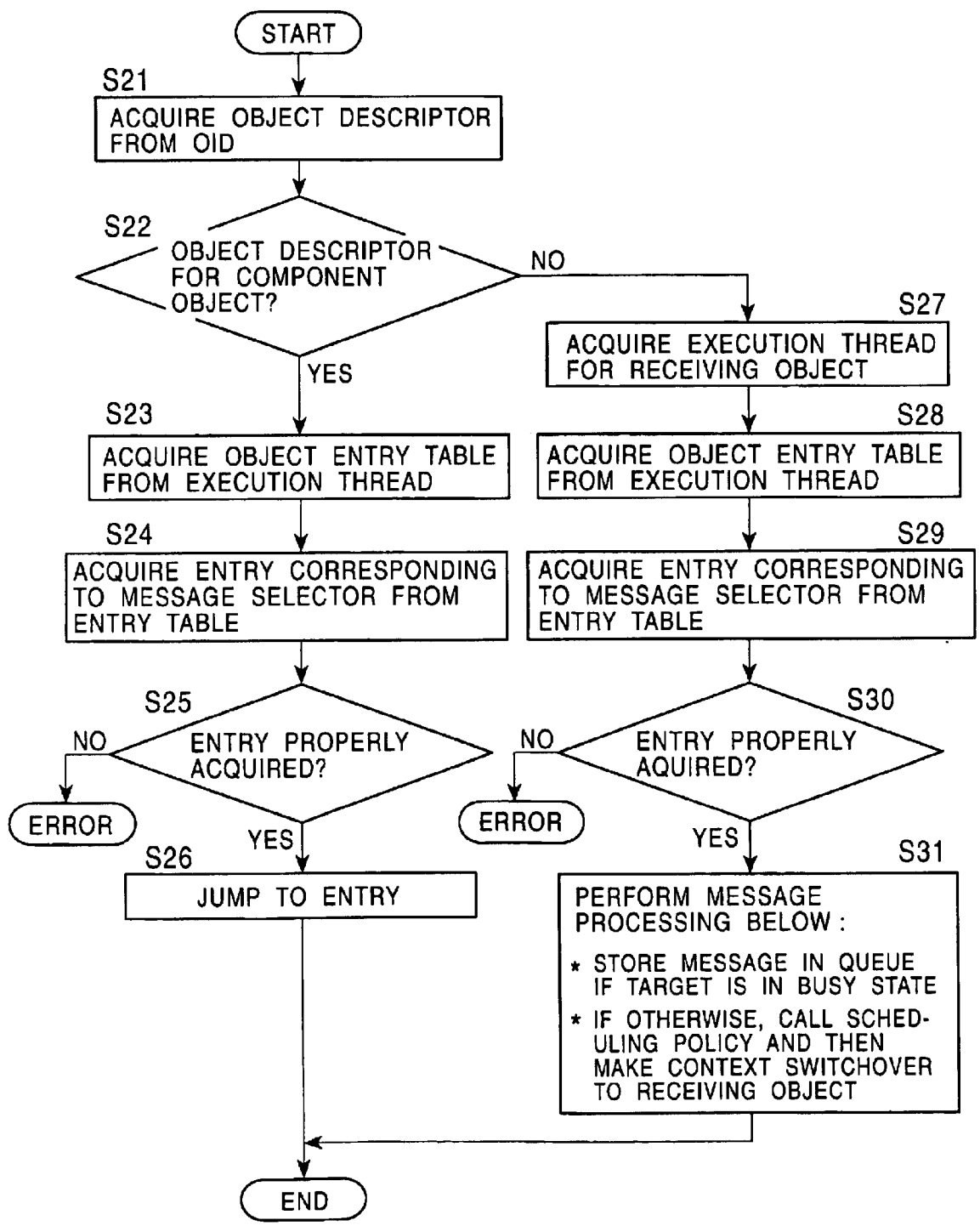
FIG. 15 is a flowchart showing a processing sequence of the procedure to be executed upon issuance of an API "Send( )" for message transmission when the object on the message transmitting side is a component object.

In the case where the object on the message transmitting side is a component object, message processing is started in a library linked to the composite object. The procedure to be carried out upon issuance of the API "Send( )" for message transmission when the object on the message transmitting side is a component object, will be explained with reference to FIG. 15.

First, in step S21, the object descriptor is acquired from the OID of the receiving object, the OID being provided as an argument of the "Send( )". At this time, an "object table" describing the correlation between object descriptors and OIDs has been created beforehand. The object table is referenced when acquiring the object descriptor from the OID.

Then, in step S22, the object type of the object descriptor is checked. If the object type indicates a component object (i.e., if the receiving object is a component object), the processing goes to step S23.

In step S23, the "entry table" of the corresponding component object is acquired from the "execution thread" of the component object descriptor.

Then, in step 524, the entry corresponding to the message selector provided as an argument of the "Send( ) )" is acquired from the "entry table" that has been acquired in step S23.

Then, in step S25, it is checked whether the entry has been properly acquired in step S24. If the entry has not been properly acquired, an error notice is replied. If the entry has been properly acquired, the processing goes to step S26 from which the processing is directly jumped to the entry acquired in step S24. As a result, control is shifted from the transmitting object to the receiving object, thus meaning that message communication has been carried out. Namely, in the case where the transmitting object to the receiving object are both component objects, switchover of the execution thread does not take place, and inter-object communication is performed in a similar control flow as when calling a function.

On the other hand, if the object type of the object descriptor indicates a standard object in step S22 (i.e., if the receiving object is a standard object), the processing goes to step S27.

In step S27, the "execution thread" of the standard object descriptor is acquired. Stated otherwise, in step 27, the "execution thread" corresponding to the receiving object is acquired.

Then, in step S28, the "entry table" of the corresponding standard object is acquired from the "execution thread" that has been acquired in step S27.

Then, in step S29, the entry corresponding to the message selector provided as an argument of the "Send( )" is acquired from the "entry table" that has been acquired in step S28.

Then, in step S30, it is checked whether the entry has been properly acquired in step S29. If the entry has not been properly acquired, an error notice is replied. If the entry has been properly acquired, the processing goes to step S31.

In step S31, the processing of message communication as shown FIG. 3 or 4 is carried out. On this occasion, as described above with reference to FIGS. 3 and 4, the processing including the message queue operation and call of the object "scheduling policy" is carried out, and the execution thread is finally switched over to the receiving object. Incidentally, where the receiving object is the object "scheduling policy", the procedure is performed in basically the same way, but exceptional processing is performed within the scheduling policy in such a case.

The foregoing is the procedure carried out when the component object issues the API "Send( )" for message transmission.

As seen from the above description, when message communication is performed between component objects, the processing including the message queue operation, call of the object "scheduling policy" and switchover of the execution thread (i.e., the processing in step S31) is omitted, thus resulting in a remarkably reduced communication cost.

(2) Case where Object on Message Transmitting Side is Standard Object

Figure 16:
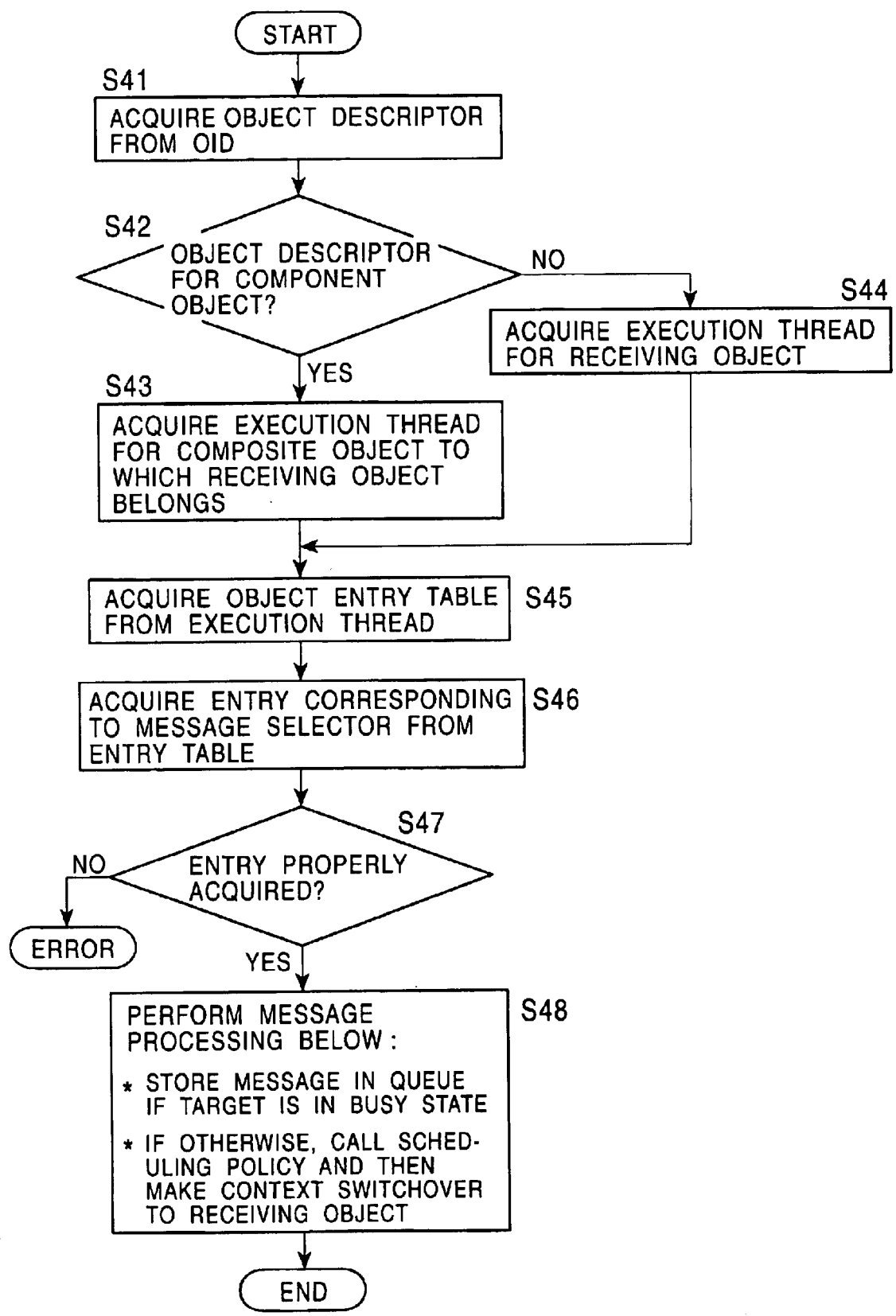
FIG. 16 is a flowchart showing a processing sequence of the procedure to be executed upon issuance of the API "Send( )" for message transmission when the object on the message transmitting side is a standard object.

In the case where the object on the message transmitting side is a standard object, message processing is started by the object "message handler". The procedure to be carried out upon issuance of the API "Send( )" for message transmission when the object on the message transmitting side is a standard object, will be explained with reference to FIG. 16.

First, in step S41, the object descriptor is acquired from the OID of the receiving object, the OID being provided as an argument of the "Send( )". At this time, an "object table" describing the correlation between object descriptors and OIDs has been created beforehand. The object table is referenced when acquiring the object descriptor from the OID.

Then, in step S42, the object type of the object descriptor is checked. If the object type indicates a component object (i.e., if the receiving object is a component object), the processing goes to step S43. On the other hand, if the object type indicates a standard object (i.e., if the receiving object is a standard object), the processing goes to step S44.

In step S43, the standard object descriptor of the composite object, to which the receiving object belongs, is acquired via the component object descriptor, and the "execution thread" of the composite object is acquired from the standard object descriptor. The processing then goes to step S45.

Alternatively, in step S44, the standard object descriptor of the receiving object is acquired and the "execution thread" of the receiving object is acquired from the standard object descriptor. The processing then goes to step S45.

In step S45, the "entry table" of the corresponding component object is acquired from the "execution thread" that has been acquired in step S43 or step S44.

Then, in step S46, the entry corresponding to the message selector provided as an argument of the "Send( )" is acquired from the "entry table" that has been acquired in step S45.

Then, in step S47, it is checked whether the entry has been properly acquired in step S46. If the entry has not been properly acquired, an error notice is replied. If the entry has been properly acquired, the processing goes to step S48.

In step S48, the processing of message communication as shown FIG. 3 or 4 is carried out. On this occasion, as described above with reference to FIGS. 3 and 4, the processing including the message queue operation and call of the object "scheduling policy" is carried out, and the execution thread is finally switched over to the receiving object. Incidentally, where the receiving object is the object "scheduling policy", the procedure is performed in basically the same way, but exceptional processing is performed within the scheduling policy in such a case.

The foregoing is the procedure carried out when the standard object issues the API "Send( )" for message transmission. In addition, the procedure carried out when the receiving object and the transmitting object are both standard objects is the same as the procedure employed before introducing the composite object except that the object descriptor is checked in step S42.

2-5-6 Example of Composite Object

This chapter explains an example wherein, in the object-oriented operating system shown in FIG. 2, part of system objects for providing the operating system service is realized as a composite object, thereby reducing the cost of communication between the system objects and improving the performance in execution of the overall operating system.

Figure 17:
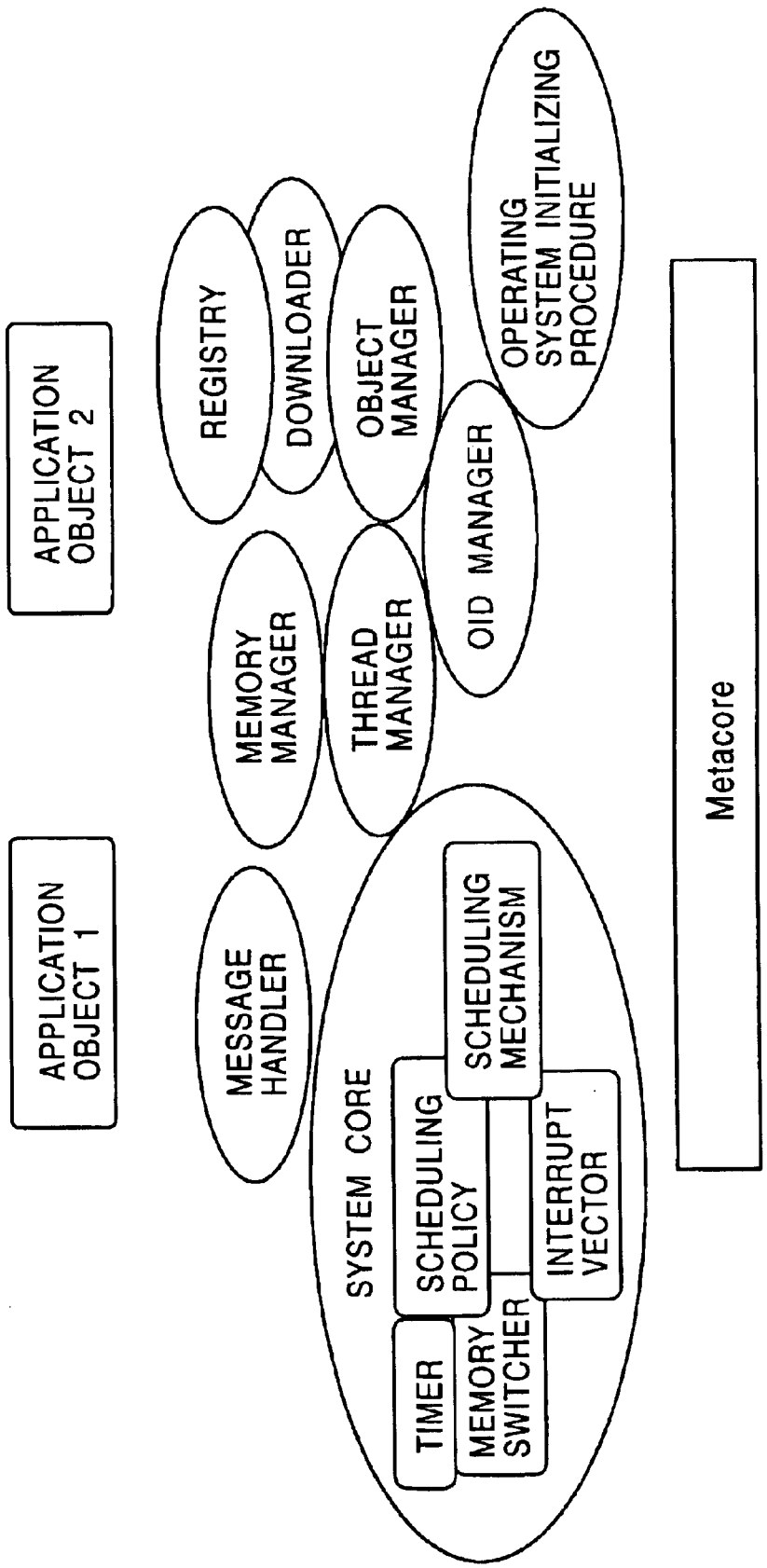
FIG. 17 is a representation showing an example in which part of system objects providing service of an operating system is realized as a composite object.

In this example, as shown in FIG. 17, a composite object "system core" is formed. The composite object "system core" includes, as component objects, "timer", "memory switcher", "scheduling policy", "scheduling mechanism", and "interrupt vector".

In the procedure of message communication between objects, as shown in FIGS. 3 and 4, messages are frequently passed among the object "memory switcher", the object ",scheduling policy", the object "scheduling mechanism", and the object "timer". Further, there is a sequential execution relation among those objects. By defining those objects as component objects making up the composite object "system core", therefore, the performance of the message communication mechanism is improved and hence the performance in execution of the overall operating system is improved.

Also, the object "interrupt vector" transfers messages to and from the object "scheduling policy" and the object "scheduling mechanism" in each interrupt processing. Further, there is a sequential execution relation among those three objects. By defining those objects as component objects making up the composite object "system core", therefore, the performance of the interrupt processing is improved and hence the performance in execution of the overall operating system is improved.

The kinds of component objects to be incorporated in a composite object can be defined beforehand by describing those component objects in the "component object configuration file". Stated otherwise, the kinds of component objects to be incorporated in part of a service providing section of the operating system, which is defined as being provided by a composite object, are decided just by describing those component objects in the "component object configuration file" as shown above in the code 3 in chapter 2-5-3. Also, component objects to be incorporated in a composite object can be dynamically changed or replaced.

For part of a service providing section of the operating system which is defined as being provided by a composite object, therefore, the component objects making up the composite object can be defined so as to achieve the desired operation, or the component objects making up the composite object can be dynamically changed or replaced later as needed. The method for dynamically changing or replacing the component objects will be described in chapter 2-6 below.

2-6 Dynamic Combining and separation of Component objects

Setting standards objects as component objects in a composite object is referred to as "combining" of objects. Conversely, extracting component objects in a composite object, as standards objects, from the composite object is referred to as "separation" of objects. This chapter explains the method for combining or separating the component objects in a dynamic way (i.e., during execution of the operating system). By performing the dynamic combining or separation to change or replace the kinds of component objects, the operation of the operating system can be flexibly changed.

2-6-1 APIs for Use in Combining and Separation

APIs for use in combining and separating objects will be described in connection with concrete examples.

An API "AddComponent( )" is used for combining objects, and an API "RemoveComponent( )" is used for separating objects. These APIs are defined in a library linked to the composite object and can be used in the composite object. These APIs will be described below in detail.

sError AddComponent(in char* object_name, in long-word entry_num, in Entry Prologue_entry, out OID object_oid);

This API converts an object defined as a standard object into a component object of a composite object that has issued this API. In this API, the name of the object to be converted into a composite object is set in the input argument "object_name". After initialization of the combined object, the name set in the input argument "object_name" is registered in a registry. The thus-set name is employed when another object references to the object combined by this API. Also, the number of entries of the object to be combined is set in the input argument "entry_num". Further, the entry point of the prologue method to be called at the time of initializing the object to be combined is set in the input argument "prologue_entry". Additionally, this API stores the OID of the component object produced upon combination, as a return value, in the output argument "object_oid".

sError RemoveComponent(in char* object_name, out OID object_oid);

API separates, as a standard object, a component object in a composite object that has issued this API. Here, the name of an object to be separated from the composite object is set in the input argument "object_name". In other words, this API separates an object referenced by the input argument "object_name" from a composite object that has issued this API, and makes the separated object independent as a standard object. Also, this API stores the OID of the standard object separated and produced from the composite object, as a return value, in the output argument "object_oid".

When "AddComponent( )" or "RemoveComponent( )" is issued, the status of an object is reset and the initializing procedure is carried out again upon completion of the object combining or separating procedure.

An example of a program for combining two existing standard objects into component objects of one composite by using the above-described APIs is shown below as a code 4. In the program of the code 4, an object "ObjectA" and an object "ObjectB" are incorporated in an object "System-Core". On this occasion, a method "AddAandB( )" of an object "ObjectC" calls an object "SystemCore" and registers the object "ObjectA" and the object "ObjectB".

Code 4: Example of Programming for Combining

```
1: void SystemCore::Add (char* name, number,
    prologue)
2: {
3: AddComponent (name, number, prologue)
4:}
5:
6: void ObjectC::AddAandB ( )
7: {
8: #define NAME_OBJECT_A "ObjectA"
9: #define NAME_OBJECT_B "ObjectB"
10:
11: OID objectA, objectB, systemcore;
12:
13: struct SystemCoreAddMsg {
14: char name [16];
15: longword number;
16: Entry entry;
17:} msgA, msgB:
18:
19: FindOID ("systemCore", &systemCore);
20: FindOID ("NAME_OBJECT_A, &objectA);
21: FindOID ("NAME_OBJECT_B, &objectB);
22: strcpy (msgA.name, "NAME_OBJECT_A);
23: strcpy (msgB.name, "NAME_OBJECT_B);
24: msgA.number=FindEntryNumber (objectA);
25: msgB.number=FindEntryNumber (objectB);
26: msgA.entry=FindPrologue (objectA);
27: msgB.entry=FindPrologue (objectB);
28:
29: Send (SystemCore, INDEX_ADD, &msgA);
30: Send (SystemCore, INDEX_ADD, &msgB);
31:}
```

In the above code 4, lines 1 to 4 represent the method "Add( )" of the object "SystemCore" and finally call the API "AddComponent( )" to add component objects.

The method "Add( )" is called by the method "ObjectC::AddAandB( )" described in lines subsequent to line 6.

In the method "ObjectC::AddAandB( )", the object "SystemCore" is searched for in line 19 in preparation of message communication performed later. Further, the object "ObjectA" is searched for in line 20 and the object "ObjectB" is searched for in line 21.

In lines 22 to 27, values are set in the structure "SystemCoreAddMsg" that is defined in lines 13 to 17. The values set in the structure "SystemCoreAddMsg" are given to three arguments in the method "Add( )" of the object "System-Core" during message communication.

The method "FindEntryNumber( )" used in lines 24 and 25 acquires the number of entries of the object having the OID given as an argument. More specifically, the number of entries of the object "ObjectA" is acquired by the method "FindEntryNumber( )" in line 24, and the number of entries of the object "ObjectB" is acquired by the method "FindEntryNumber( )" in line 25.

The method "FindPrologue( )" used in lines 26 and 27 acquires an entry point to the prologue method of the object having the OID given as an argument. More specifically, the entry point to the prologue method of the object "ObjectA" is acquired by the method "FindPrologue( )" in line 26, and the entry point to the prologue method of the object "ObjectB" is acquired by the method "FindPrologue( )" in line 27.

In line 29, a message for the method "Add( )" of the object "SystemCore" is transmitted along with a parameter regarding the object "ObjectA". The argument "INDEX_ADD" is a method selector corresponding to the method "Add( )" of the object "SystemCore".

In line 30, a message for the method "Add( )" of the object "SystemCore" is transmitted along with a parameter regarding the object "ObjectB". The argument "INDEX_ADD" is a method selector corresponding to the method "Add( )" of the object "SystemCore".

While only a section for combining the two objects "ObjectA" and "ObjectB" is shown in the above program example, it is also possible to flexibly change the operation of the operating system by repeating a cycle of object definition, combining, separation, object deletion, object redefinition, and recombining.

2-6-2 Combining Algorithm and separating Algorithm

A description will be made of the combining algorithm executed upon issuance of the API "AddComponent( )" and the separating algorithm executed upon issuance of the API "RemoveComponent( )".

(1) "AddComponent( )"

When "AddComponent( )" is issued, the initializing procedure of the component object shown in FIG. 13 is called. This initializing procedure is carried out as described above in chapter 2-5-3. However, chapter 2-5-3 explains the case where the initializing procedure of the composite object is performed, and the composite object to be initialized reads the existing "component object configuration file" by itself and then acquires information of the component object. On the other hand, when "AddComponent( )" is issued, information of the component object is provided as an argument of "AddComponent( )". Also, the OID of the newly produced object is stored in the output L argument "object_oid" of "AddComponent( )".

(2) "RemoveComponent( )"

Figure 18:
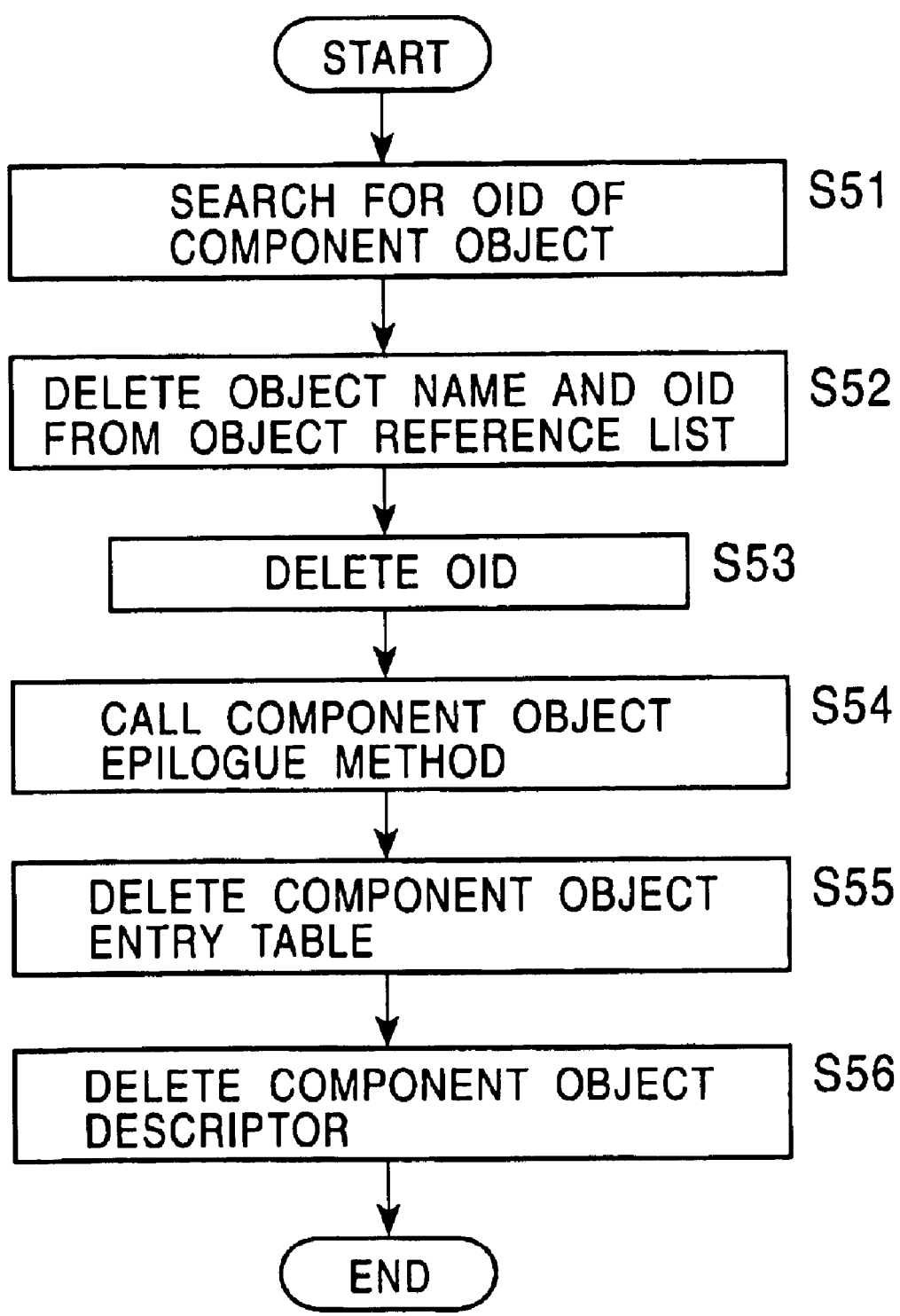
FIG. 18 is a flowchart showing a processing sequence of the procedure to be executed upon issuance of an API "RemoveComponent( )" for object separation.

The separating algorithm executed upon issuance of the API "RemoveComponent( )" is described with reference to FIG. 18.

When "RemoveComponent( )" is issued, the OID of the component object to be separated is first acquired in step S51 from the object name set in the input argument "object_name" of "RemoveComponent( )".

Then, in step S52, the object name and the OID of the component object to be separated are deleted from the object reference list in the composite object.

Then, in step S53, the OID of the component object to be separated is deleted.

Then, in step S54, the epilogue method of the component object to be separated is called. The epilogue method is a method called at the time of deleting an object, and releases an unnecessary data area, for example.

Then, in step S55, the entry table of the component object to be separated is deleted.

Then, in step S56, the component object descriptor corresponding to the component object to be separated is deleted.

The separating operation is completed through the above-described steps, whereby the component object of which object name has been set in the input argument "object_name" of "RemoveComponent( )" is deleted from the composite object.

2-7 Advantage Resulted from Introducing Composite Component

By introducing a composite object, the cost of message communication between objects can be reduced. Further, by employing a composite object to constitute a service providing section of an operating system, the service providing section of the operating system can be added or deleted in a dynamic manner.

Thus, introducing a composite object makes it possible to reduce the cost of communication between objects and to improve the performance in execution of the overall operating system while maintaining flexibility of the operating system.

According to the present invention, as fully described above, the superior features of an object-oriented operating system, such as flexibility in system configuration, can be maintained while the performance in execution of the overall system can be improved.

What is claimed is:

1. A data processing apparatus for executing an object-oriented operating system made up of a plurality of objects among which messages are communicated, said data processing apparatus comprising:

means for rendering an object, which has received a combining request message requesting addition of a predetermined object, to create a table data structure used for referencing to said predetermined object as a component object, and to initialize said table data structure with data of said component object, thereby constituting a composite object;

means for creating a data structure of at least one said component object, registering the data structure in said table data structure, and registering a relationship between at least one message processing function possessed by said component object and a message interface for requesting the message processing function in the data structure of said component object;

means for checking, when a predetermined object is added to said composite object, whether a sequential execution relation exists between said predetermined object and all of component objects making up said composite object; and means for adding said predetermined object after the sequential execution relation has been confirmed such that said predetermined object is not added to said composite object if said sequential execution relation does not exist between said predetermined object and all of component objects making up said composite object;

wherein said composite object has a thread and each component object of said composite object uses that thread for communicating with one another;

wherein said composite object has a specific execution thread and executes message processing issued to said component object with said specific execution thread; and wherein upon receiving a request for adding a predetermined component object, said composite object additionally registers a data structure of said predetermined component object in said table data structure.

2. A data processing apparatus according to claim 1, wherein the sequential execution relation is checked by means for checking the fact that at the time when a message is transmitted to said predetermined object, all of the component objects making up said composite object are not required to run in parallel to said predetermined object, means for checking the fact that at the time when said predetermined object transmits a message to one of the component objects making up said composite object, the one component object is never already under processing of another message, and means for checking the fact that at the time when said predetermined object receives a message from one of the component objects making up said composite object, said predetermined object is never already under processing of another message.

3. A data processing method for an object-oriented operating system made up of a plurality of objects among which messages are communicated, said data processing method comprising the steps of:

rendering an object, which has received a combining request message requesting addition of a predetermined object, to create a table data structure used for referencing to said predetermined object as a component object, and to initialize said table data structure with data of said component object, thereby constituting a composite object;

creating a data structure of at least one said component object, registering the data structure in said table data structure, and registering a relationship between at least one message processing function possessed by said component object and a message interface for requesting the message processing function in the data structure of said component object;

checking, when a predetermined object is added to said composite object, whether a sequential execution relation exists between said predetermined object and all of component objects making up said composite object; and adding said predetermined object after the sequential execution relation has been confirmed such that said predetermined object is not added to said composite object if said sequential execution relation does not exist between said predetermined object and all of component objects making up said composite objects;

wherein said composite object has a thread and each component object of said composite object uses that thread for communicating with one another;

wherein said composite object has a specific execution thread and executes message processing issued to said component object with said specific execution thread; and wherein upon receiving a request for adding a predetermined component object, said composite object additionally registers a data structure of said predetermined component object in said table data structure.

4. A data processing method according to claim 3, wherein the sequential execution relation is checked by a step of checking the fact that at the time when a message is transmitted to said predetermined object, all of the component objects making up said composite object are not required to run in parallel to said predetermined object, a step of checking the fact that at the time when said predetermined object transmits a message to one of the component objects making up said composite object, the one component object is never already under processing of another message, and a step of checking the fact that at the time when said predetermined object receives a message from one of the component objects making up said composite object, said predetermined object is never already under processing of another message.

* * * * *